United States Patent
Hara

(10) Patent No.: US 7,381,889 B2
(45) Date of Patent: Jun. 3, 2008

(54) WIRING SHEET, ELECTRIC DISTRIBUTION BOX AND METHOD OF CUTTING WIRES

(75) Inventor: Yasuhiro Hara, Ogasa-gun (JP)

(73) Assignee: Yazaki Corporation, Tokyo (JP)

( * ) Notice: Subject to any disclaimer, the term of this patent is extended or adjusted under 35 U.S.C. 154(b) by 598 days.

(21) Appl. No.: 10/650,788

(22) Filed: Aug. 29, 2003

(65) Prior Publication Data

US 2004/0051399 A1  Mar. 18, 2004

(30) Foreign Application Priority Data

Aug. 30, 2002  (JP)  ............................. P2002-255601

(51) Int. Cl.
*H02G 3/08* (2006.01)
(52) U.S. Cl. .................. 174/50; 174/520; 439/76.1; 439/76.2
(58) Field of Classification Search .................. 174/50, 174/53, 58, 57, 52.1, 59, 72 A, 72 B, 71 B, 174/88 B, 99 B, 60; 220/3.2, 3.3, 3.8, 4.02; 439/909, 76.1, 76.2, 404, 688, 724, 65, 66, 439/535; 361/600
See application file for complete search history.

(56) References Cited

U.S. PATENT DOCUMENTS

| | | | |
|---|---|---|---|
| 5,012,391 A | | 4/1991 | Schultz, Jr. |
| 5,295,842 A | * | 3/1994 | Ozaki et al. ............... 439/76.2 |
| 5,703,757 A | * | 12/1997 | Hayes et al. ............... 439/76.2 |
| 5,888,088 A | * | 3/1999 | Kobayashi et al. ......... 439/949 |
| 6,310,293 B1 | * | 10/2001 | Kawakita .................. 174/70 B |
| 6,315,578 B1 | * | 11/2001 | Kasai et al. ............... 439/76.2 |
| 6,422,889 B2 | * | 7/2002 | Hayashi ................... 174/72 A |
| 6,573,453 B2 | * | 6/2003 | Takada et al. ............ 174/72 A |
| 6,582,239 B2 | * | 6/2003 | Ozawa ...................... 439/76.2 |
| 6,648,671 B2 | * | 11/2003 | Suzuki et al. ............... 439/404 |
| 6,780,026 B2 | * | 8/2004 | Sato .......................... 439/76.2 |
| 6,824,398 B2 | * | 11/2004 | Hara ........................ 439/76.2 |
| 6,866,537 B2 | * | 3/2005 | Yuasa et al. ............... 439/395 |

FOREIGN PATENT DOCUMENTS

| | | |
|---|---|---|
| EP | 0 698 950 A2 | 2/1996 |
| EP | 0 729 200 A2 | 8/1996 |
| JP | 4-74858 U | 6/1992 |
| JP | 08-079937 A | 3/1996 |
| JP | 2001-061214 A | 3/2001 |
| WO | WO 02/49407 A1 | 6/2002 |

* cited by examiner

*Primary Examiner*—Angel R. Estrada
(74) *Attorney, Agent, or Firm*—Sughrue Mion, PLLC

(57) ABSTRACT

A wiring sheet for installing a plurality of wires thereon includes a side plate portion, at which end portions of the wires forming circuits are collectively disposed. The wiring sheet is provided in an electric distribution box along with a main body which houses the wiring sheet therein. The main body includes a side wall for protecting the end portions of the wires exposed from the side plate portion.

5 Claims, 13 Drawing Sheets

WIRING SHEET, ELECTRIC DISTRIBUTION BOX AND METHOD OF CUTTING WIRES

BACKGROUND OF THE INVENTION

This invention relates to a wiring sheet and an electric distribution box in which for example, an electronic unit (electronic control device) for a vehicle is mounted, and a wire-cutting operation can be easily effected, and the invention also relates to a method of cutting wire.

FIG. 13 shows one related electric distribution box.

This electric distribution box 501 includes an upper cover 502 made of a synthetic resin, a lower cover 503 (i.e., a distribution box body), and a wire wiring board 504 and a bus bar wiring board 505 which are received between the two covers 502 and 503 in a stacked manner.

The wire wiring board 504 includes an insulating board portion 506 made of a synthetic resin, a plurality of insulating sheathed wires 507 laid on a surface of the insulating board portion 506, and terminals 508 which extend through the insulating board portion 506, and are press-contacted respectively with wires 507. A press-contacting portion 508a is formed at one end of the terminal 508 while a male tab-like electrical contact portion 508b is formed at the other end thereof.

The bus bar wiring board 505 includes an insulating board portion 509, and a plurality of bus bars 510 installed on a surface of the insulating board portion 509. The bus bar 510 has an integral male tab-like terminal 511 extending upwardly therefrom or an integral male tab-like terminal 511 extending downwardly therefrom.

The terminals 508 and 511 project into corresponding housings 512 and 513 formed at the upper cover 502 and the lower cover 503, and the terminals 508 and 511 are combined with the housings 512 and 513 to form connectors. Connectors (not shown) of external wire harnesses are connected to these connectors.

In the above related electric distribution box 501, however, the wires 507, installed on the wiring board 504, need to be cut one by one, using a tool such for example as a nipper (not shown), and the operation for cutting the wires 507 was not effected efficiently. And besides, there was a fear that the worker forget to cut one or more wires 507, so that a predetermined circuit failed to be formed.

In view of the above circumstances, it is an object of this invention to provide a wiring sheet, an electric distribution box, and a method of cutting wire, in which a wire-cutting operation can be carried out easily, and troubles, such as the failure to cut a wire, are prevented during the wire-cutting process, thereby enhancing the reliability.

SUMMARY OF THE INVENTION

In order to achieve the above object, according to the present invention, there is provided a wiring sheet for installing a plurality of wires thereon, comprising:
a side plate portion, at which end portions of the wires forming circuits are collectively disposed.

With this construction, for example, there can be easily carried out an operation in which the wire is cut along the side plate portion of the wiring sheet, so that the circuits, provided with the plurality of wires, are formed at the wiring sheet. Therefore, the circuits, provided with the plurality of wires, can be easily and rapidly formed at the wiring sheet, and therefore there is provided the wiring sheet which is excellent in productivity.

Preferably, a plurality of mounting portions are formed on the side plate portion. The end portions of the wires are fixed to the plurality of mounting portions, respectively.

With this construction, the end portions of the wires are positively kept retained respectively in the mounting portions provided at the one side plate portion of the wiring sheet. And besides, for example, the wire cutting operation can be carried out at the one side plate portion of the wiring sheet, and by doing so, the wire-cutting operation can be carried out rapidly.

Preferably, wherein each of the mounting portions has a groove shape for holding the end portion of each of the wires.

With this construction, the wires are positively fixed to the one side plate portion of the wiring sheet over a long period of time. And besides, when the wire is to be cut so as to form the circuits (provided with the plurality of wires) at the wiring sheet, the wire will not be flexed, thereby avoiding a trouble such as the failure to cut the wire, and as a result the circuits, provided with the plurality of wires, are easily and positively formed at the wiring sheet.

Preferably, the wiring sheet further comprises a board portion placed horizontally. The side plate portion is vertically formed at a peripheral portion of the board portion. The end portions of the wires are disposed outside of the board portion and the side plate portion of the wiring sheet.

With this construction; the end portions of the wires, are not disposed on the base plate portion of the wiring sheet. Therefore, the end portions of the wires will not contact other parts on the wiring sheet, thereby preventing electrical troubles such as the short-circuiting in the circuits of the wiring sheet, and therefore the reliability of the wiring sheets is enhanced.

According to the present invention, there is also provided an electric distribution box, comprising:
a wiring sheet for installing a plurality of wires thereon, including:
a side plate portion, at which end portions of the wires forming a circuit are collectively disposed; and
a main body, housing the wiring sheet therein, and having a side wall for protecting the end portions of the plurality of wires exposed from the side plate portion.

With this construction, the end portions of the plurality of wires will not be exposed to the exterior of the main body. Therefore, electrical troubles will not occur in the electric distribution box, and the reliability of the electric distribution box is enhanced.

Preferably, the wiring sheet includes a board portion placed horizontally. The side plate portion is vertically formed at a peripheral portion of the board portion. The end portions of the wires are disposed outside of the board portion and the side plate portion of the wiring sheet.

With this construction, the end portions of the wires, will not be exposed to the exterior of the base wall and side wall of the electric distribution box. Therefore, electrical troubles will not occur in the electric distribution box, and there can be provided the electric distribution box of enhanced reliability.

Preferably, a plurality of mounting portions are formed on the side plate portion. The end portions of the wires are fixed to the plurality of mounting portions, respectively.

Preferably, each of the mounting portions has a groove for holding the end portion of each of the wire.

Preferably, the wiring sheet includes a board portion placed horizontally. The side plate portion is vertically formed at a peripheral portion of the board portion. The end portions of the wires are disposed outside of the board portion and the side plate portion of the wiring sheet.

According to the present invention, there is also provided a method of cutting wires, comprising the steps of:

installing the wires on a wiring sheet;

fixing portions of the wire to a side plate portion of the wiring sheet; and cutting the portions of the fixed wire so as to divide into a plurality of end portions of the wires so that circuits formed by the cut wires are provided.

In the above method, the wire is installed on the wiring sheet, and is fixed to the wiring sheet, and therefore the wire is positively fixed to the wiring sheet. And, the portions of the wire are fixed to the side plate portion of the wiring sheet, and the wire is divided into the plurality of wires by cutting the portions of the wire, and therefore the portions of the wire are easily cut. And besides, with this wire-cutting method, the portions of the wire are cut efficiently and rapidly. Therefore, the efficiency of the process of cutting the wire is enhanced.

Preferably, a plurality of mounting portions are formed on the side plate portion. The end portions of the wires are fixed to the plurality of mounting portions, respectively.

In the above method, the mounting portions, corresponding to the portions of the wire, are provided at the one side plate portion of the wiring sheet, and the portions of the wire are fixed to the mounting portions, respectively, and therefore the portions of the wire are positively mounted at the one side plate portion of the wiring sheet. And besides, the portions of the wire are fixed to the mounting portions provided at the one side plate portion of the wiring sheet, and in this condition the portions of the wire are cut, and therefore the wire-cutting operation can be carried out at the mounting portions of the one side plate portion of the wiring sheet. Therefore, the wire cutting operation does not need to be carried out at various portions of the wiring sheet, and therefore the wire-cutting operation is carried out positively and rapidly.

Preferably, each of the mounting portions has a groove for holding the end portion of each of the wires.

With the above method, the portions of the wire are positively fixed to the one side plate portion of the wiring sheet. Therefore, at the time of cutting the portions of the wire, the portions of the wire are prevented from shaking relative to the wiring sheet, and the wire-cutting operation is carried out easily and positively.

Preferably, the wiring sheet has a board portion placed horizontally. The side plate portion is vertically formed at a peripheral portion of the board portion. The end portions of the wires are disposed outside of the board portion and the side plate portion of the wiring sheet.

In the above method, the wire-cutting operation can be carried out easily. For example, when the wire-cutting operation is to be carried out by the use of a cutting tool, the cutting tool is moved along the outer side of the side plate portion of the wiring sheet, and as a result the portions of the wire, disposed at the outside of the side plate portion of the wiring sheet, are easily cut. Therefore, the wire-cutting process of cutting is carried out rapidly.

Preferably, the method further comprises the steps of:

housing the wiring sheet in a main body of an electric distribution box after performing the fixing step; and fixing portions of the wires to a side wall of the main body.

In the above method, the portions of the wire are positively fixed to the wiring sheet and the main body. Therefore, when cutting the portions of the wire, the portions of the wire are prevented from being much flexed, so that it is not difficult to effect the operation for cutting the portions of the wire. Therefore, the portions of the wire, fixed to the wiring sheet and the main body, are held in such a condition that these wire portions can be cut positively and easily.

Preferably, the portions of the wire extended to the outside of the side plate portion are cut simultaneously in the cutting step so that circuits formed by the cut wires are provided.

In the above method, troubles, such as the failure to cut the wire, are prevented at the time of cutting the wire. Therefore, the circuits, provided with the plurality of wires, can be positively formed at the wiring sheet.

BRIEF DESCRIPTION OF THE DRAWINGS

The above objects and advantages of the present invention will become more apparent by describing in detail preferred exemplary embodiments thereof with reference to the accompanying drawings, wherein:

FIG. 3A is a view showing a condition before the wiring member is press-contacted with the press-contacting terminal, and FIG. 3B is a view showing a condition after the wiring member is press-contacted with the press-contacting terminal;

DETAILED DESCRIPTION OF THE PREFERRED EMBODIMENTS

Wiring sheets, an electric distribution box and a wire-cutting method, embodying the present invention, will now be described in detail with reference to the drawings.

FIGS. 1 to 9 show one preferred embodiment of the invention, showing the wiring sheets, the electric distribution box and wire-cutting method.

Figure 1:
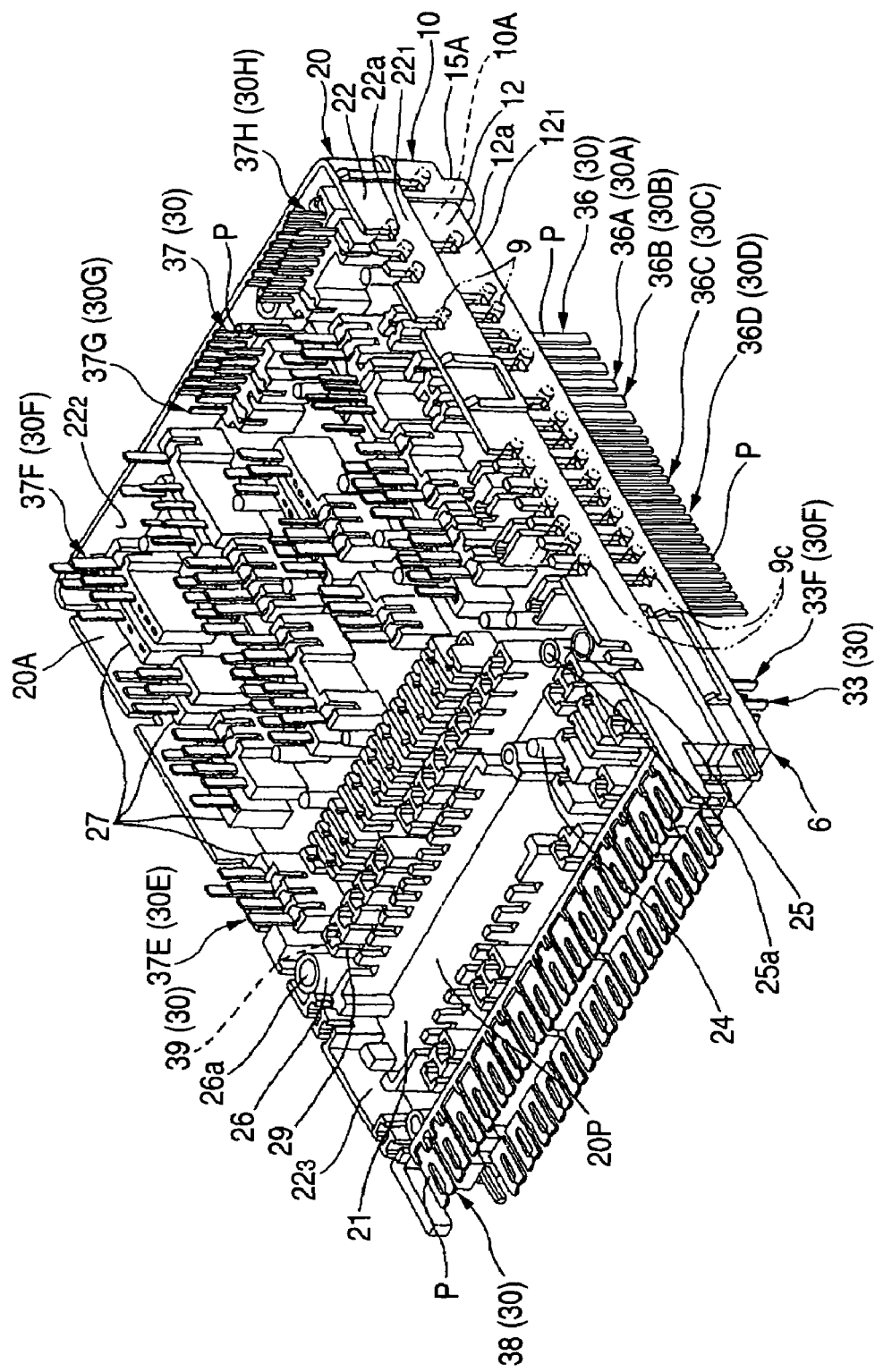
FIG. 1 is a perspective view of one preferred embodiment of the invention, showing wiring sheets and a method of cutting wire.
Figure 2:
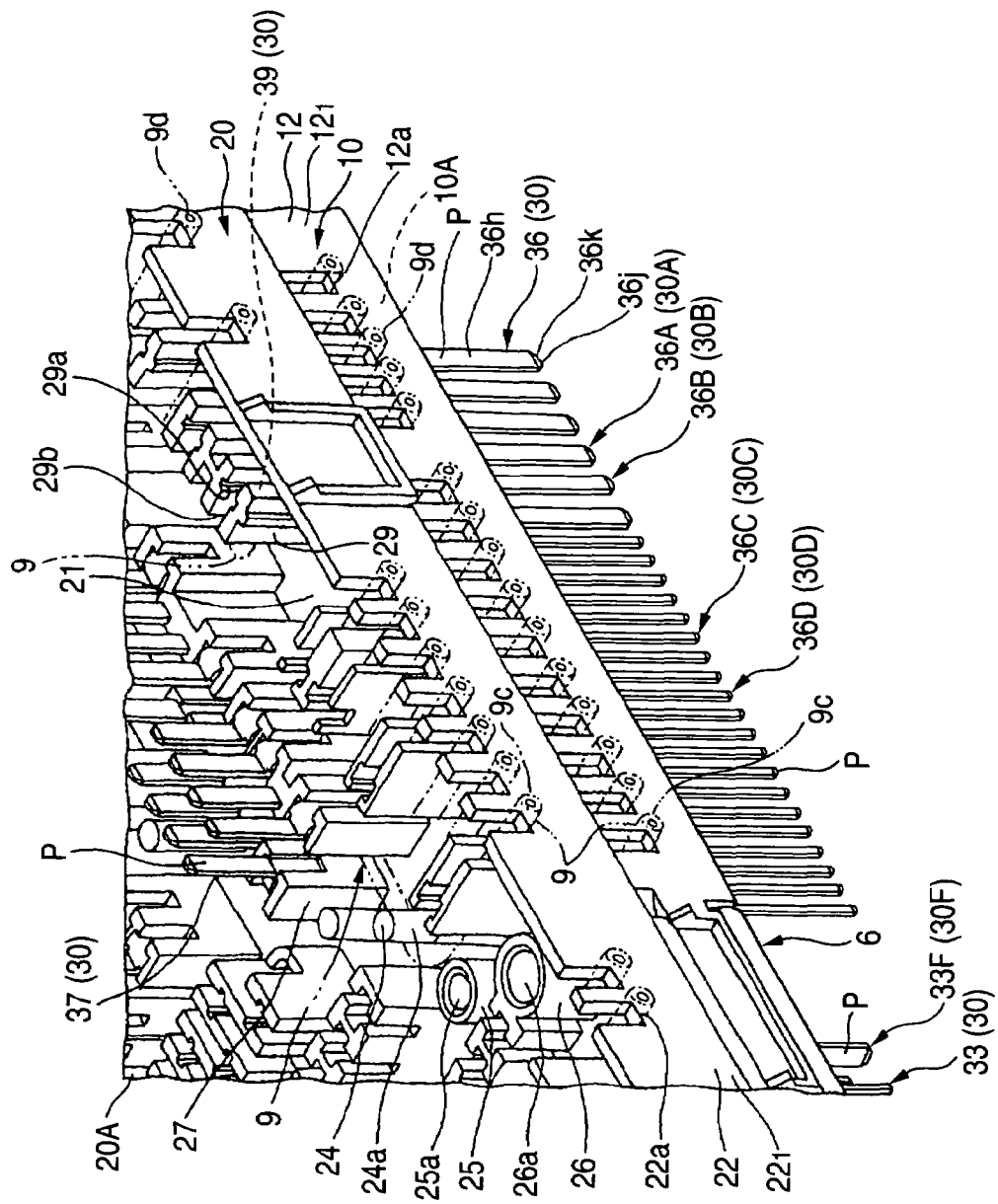
FIG. 2 is an enlarged perspective view showing a condition in which end portions of wires are disposed at side plates of the wiring sheets of FIG. 1.

Referring to the upper and lower sides of wiring sheets 10 and 20, that side at which electrical contact portions 37 of bus bars 30 project from the wiring sheet 20 is the lower side as shown in FIGS. 1 and 2. FIGS. 1 and 2 show the lower side of the wiring sheet 20. That side at which electrical contact portions 36 of bus bars 30 project from the wiring sheet 10 is the upper side as shown in FIGS. 1, 2, 4 and 5.

Figure 6:
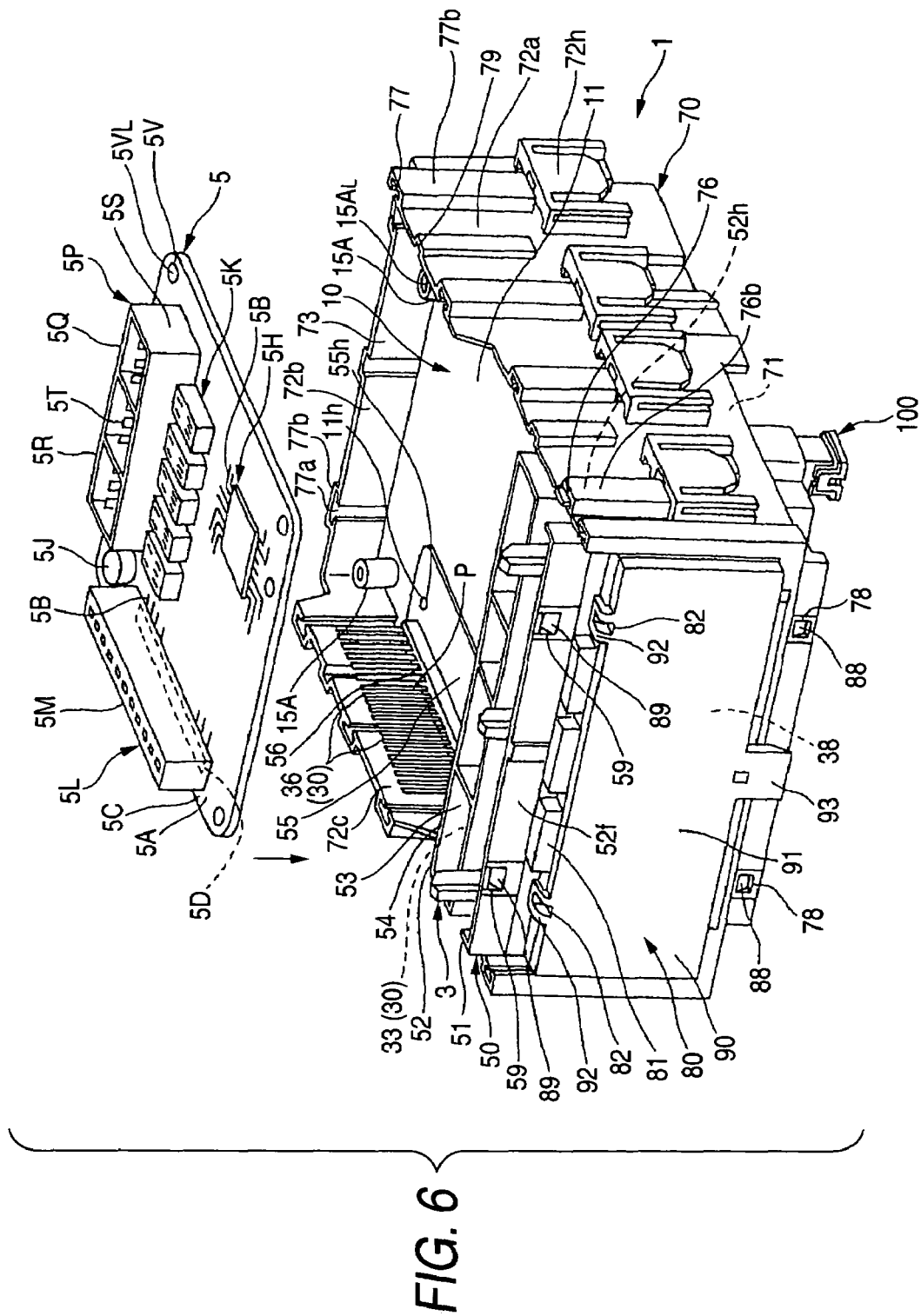
FIG. 6 is a perspective view showing one preferred embodiment of an electric distribution box of the invention.

Referring to various directions of the electric distribution box 1 with reference to FIG. 6, that side at which an electronic unit 5 is disposed in a distribution box body 70 is the upper side, and that side at which support members 100 of a synthetic resin are mounted on the distribution box body 70 is the lower side. That side at which a cover 90 is provided on a fuse block 80 is the front side, and that side at which a side wall 72b of the distribution box body 70 is disposed is the rear side. The direction in which opposed side walls 72c and 72a of the distribution box body 70 face each other is a left-right direction.

In this specification, the definitions "upper and lower", "front and rear" and "right and left" are given for convenience, that is, for the purpose of describing the various portions, and these do not always coincide with their corresponding directions when the wiring sheets and the electric distribution box are actually used and when the method of cutting wire is actually carried out.

Figure 4:
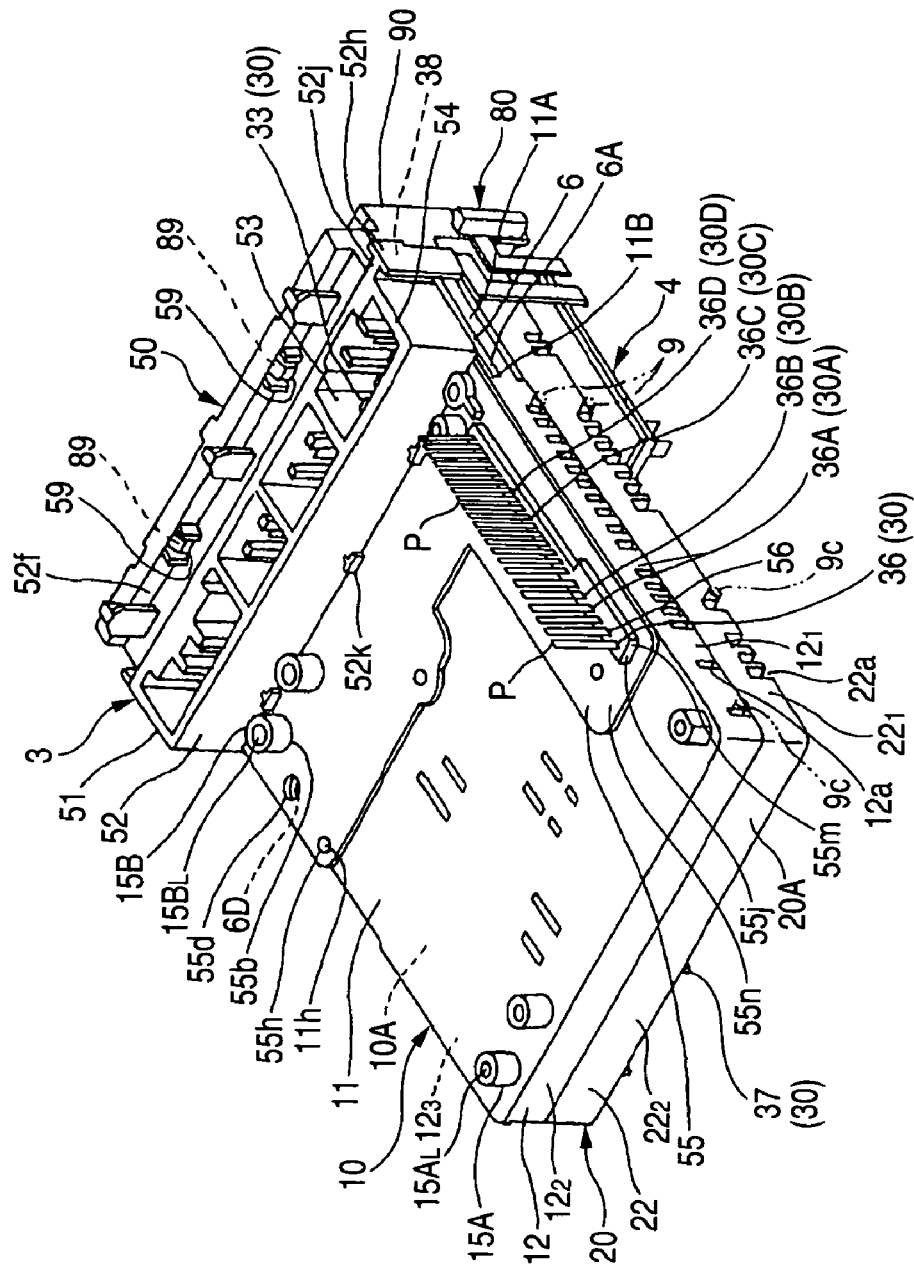
FIG. 4 is a perspective view showing a condition in which a housing member is mounted on the upper wiring sheet.
Figure 5:
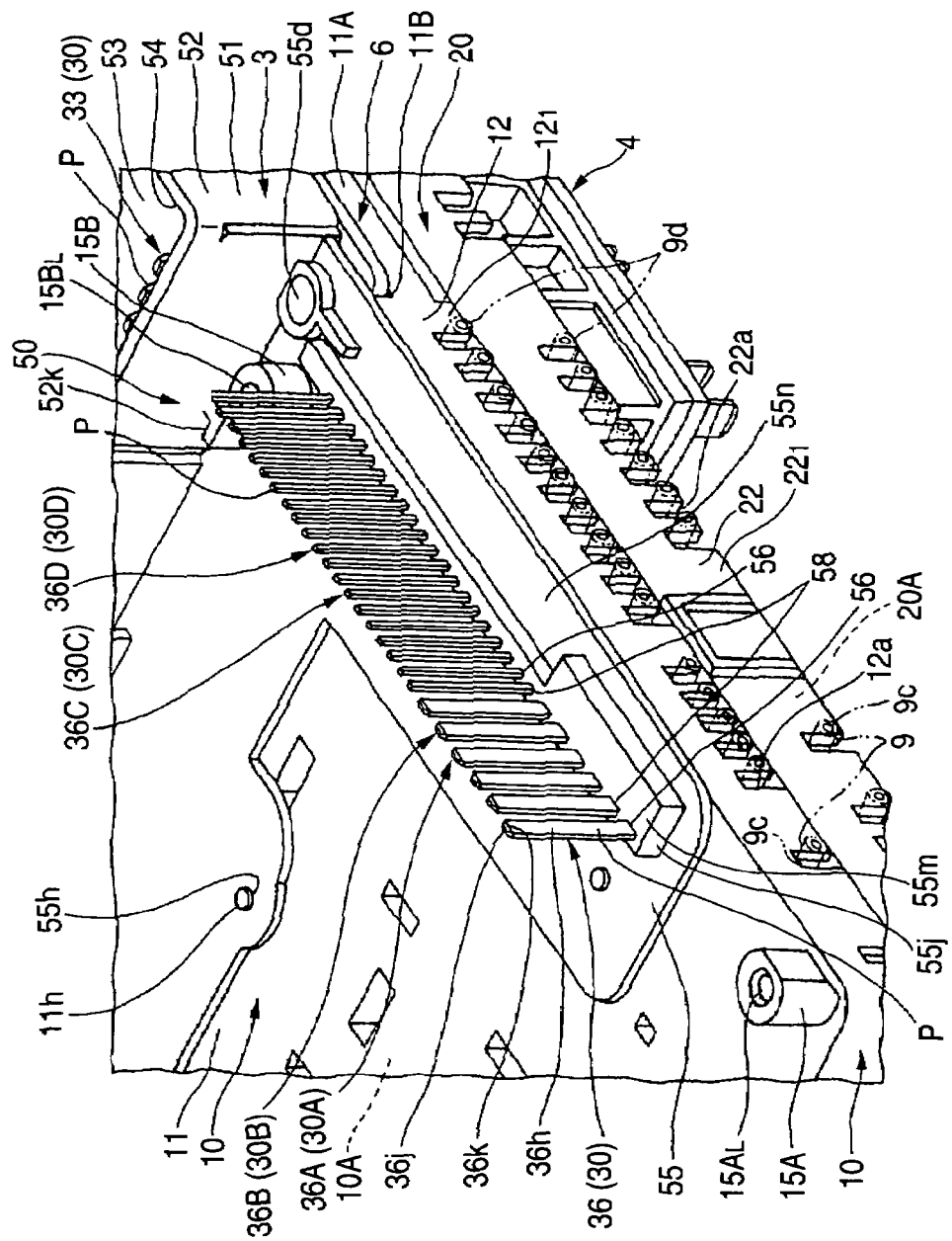
FIG. 5 is an enlarged perspective view showing a condition in which the end portions of the wires are disposed at the side plates of the wiring sheets.

As shown in FIGS. 1 and 4, the two wiring sheets 10 and 20 are combined together, and in this condition the two wiring sheets are provided within a receiving portion 73 of the distribution box body 70 shown in FIG. 6. As shown in FIGS. 4 and 5, bus bars 30 are mounted on the upper wiring sheet 10 on which a housing member 50 and the electronic unit 5 (FIG. 6) are mounted. As shown in FIGS. 1 and 2, bus bars 30 are mounted on the lower wiring sheet 20 to which the upper wiring sheet 10 is connected. As shown in FIGS. 4 and 5, another electronic unit 4 is mounted in a receiving portion 20P of the wiring sheet 20 shown in FIG. 1.

As shown in FIG. 1, metal bus bars 30E, 30F, 30G and 30H, having their respective electrical contact portions 37E, 37F, 37G and 37H of various shapes, are mounted on the wiring sheet 20 made of a synthetic resin. A portion of each of the bus bars 30F and 30H is bent into a generally crank-shape, and the electrical contact portions 37F and 37H are formed at the bus bars 30F and 30H, respectively. The electrical contact portions 37G and 37H of the bus bars 30G and 30H are smaller in width than the electrical contact portions 37E and 37F of the bus bars 30E and 30F.

As shown in FIGS. 1, 2, 4 and 5, metal bus bars 30A, 30B, 30C and 30D, having their respective electrical contact portions 36A, 36B, 36C and 36D of various shapes, are mounted on the wiring sheet 10 made of a synthetic resin. The electrical contact portions 36C and 36D of the bus bars 30C and 30D are smaller in width than the electrical contact portions 36A and 36B of the bus bars 30A and 30B.

For forming the various bus bars, for example, elongate metal terminal blanks of various shapes are formed from a flat metal sheet by the use of a pressing machine or the like, and thereafter each metal terminal blank is formed into a predetermined shape by a pressing operation such as a bending operation.

The bus bars 30A, 30B, 30C, 30D, 30E, 30F, 30G and 30H of the various shapes are representatively designated by reference numeral 30. Terminal portions 33F of the bus bars 30 are representatively designated by reference numeral 33. The electrical contact portions 36A, 36B, 36C and 36D of the various shapes are representatively designated by reference numeral 36. The other electrical contact portions 37E, 37F, 37G and 37H of the various shapes are representatively designated by reference numeral 37.

As shown in FIGS. 1 to 6, each of the bus bars 30 is tin-plated as at P. By thus applying a plating treatment to the various bus bars 30, the terminal portions 33, the electrical contact portions 36 and 37, tuning-fork terminal portions 38 or press-contacting terminal portions 39, when electrically contacted with their mating terminals or mating electrical contact portions, their contact stability and connectability are enhanced. And besides, the electrically-connectable portions are prevented from oxidation.

When the plating treatment is applied to at least one or both of the two mating terminal portions or electrical contact portions in order to enhance the weldability and the contact stability, the corrosion resistance of the terminal portion or the electrical contact portion are enhanced. When each elongate bus bar 30 is beforehand coated with a plating material P such as tin-plating P over an entire length thereof, the bus bar 30 is prevented from corrosion. As a result, in use, each bus bar 30 can maintain the stable performance for a long period of time.

Tin has a silver-white color and a metallic luster, and are excellent in ductility and malleability. Tin is oxidized when it is heated at high temperature in the atmosphere, but tin will not rust at normal temperature. Therefore, tin will not lose its luster. Thus, tin has such a nature that it is hardly changed in the air, and therefore when tin-plating is applied to the surface of a shaped member of metal such as iron, steel and copper, the corrosion of the shaped metal member will not proceed, and the shaped metal member is protected by the tin-plating coating over a long period of time.

According to the specifications of the wiring sheets and electric distribution box, the bus bars are not subjected to the plating treatment such as tin-plating, in which case the bus bars with no plating are used.

As shown in FIGS. 1 and 2, many holding portions 29 for respectively receiving the press-contacting terminal portions 39 of the metal bus bars 30, as well as many holding portions 27 for respectively receiving the tab-like electrical contact portions 37 of the metal bus bars 30, are formed at the reverse sides of the synthetic resin-molded wiring sheets 10 and 20. A plurality of generally-cylindrical fixing portions 25 and 26 are formed on the reverse side of a base plate portion 21 of the wiring sheet 20 so that the wiring sheets 10 and 20 and so on can be positively fixed to a base wall of the distribution box body through these fixing portions. A fixing hole 25a is formed in each of the fixing portions 25, and a fixing hole 26a is formed in each of the fixing portions 26, and a fastening element such as a screw is passed through the fixing hole 25a, 26a.

As shown in FIG. 2, the press-contacting terminal portions 39 (each having, for example, a shape shown in FIG. 3) of the bus bars 30 are received in receiving portions 29a of the holding portions 29, respectively. As shown in FIG. 2, wires 9 are passed through and held in passage portions 29b of the holding portions 29, respectively. As shown in FIG. 3, the wire 9 (that is, the wiring member 9) includes a circuit conductor 9a formed by twisting a plurality of thin soft copper wire elements together, and the circuit conductor 9a is covered with an insulating sheath 9b made of polyvinyl chloride, so that the wire 9 has a linear body of a generally round cross-section.

When the wires 9 are installed on the wiring sheets 10 and 20, the wires 9 are suitably bent around side surfaces 24a of cylindrical projected portions 24 formed on the wiring sheet 20, as shown in FIG. 2, and by doing so, the direction of extending of each wire 9, installed on the wiring sheet 20, can be changed. The wiring sheets 10 and 20 are used as wiring boards.

As shown in FIG. 4, the upper wiring sheet 10 includes a board portion 11 having a generally-rectangular shape in horizontal, and vertical side plate portions $12_1$, $12_2$ and $12_3$ formed at a peripheral edge portion of the board portion 11. A plurality of wires 9 are installed on the wiring sheet 10 as shown in FIG. 5. End portions 9c of the plurality of wires 9, forming circuits, are collectively disposed at one side plate portion $12_1$ of the side plate portion 12 of the wiring sheet 10. As shown in FIG. 5, the end portions 9c of the majority of the wires 9 are collectively disposed at one side plate portion $12_1$ of the wiring sheet 10.

As shown in FIG. 1, the lower wiring sheet 20 includes a board portion 21 having a generally-rectangular shape in horizontal, and vertical side plate portions $22_1$, $22_2$ and $22_3$ formed at a peripheral edge portion of the board portion 21. A plurality of wires 9 are installed on the wiring sheet 20 as shown in FIG. 2. End portions 9c of the plurality of wires 9, forming circuits, are collectively disposed at one side plate portion $22_1$ of the side plate portion 22 of the wiring sheet 20. As shown in FIGS. 1 and 2, the end portions 9c of the majority of the wires 9 are collectively disposed at one side plate portion $22_1$ of the wiring sheet 20.

The end portions 9c of the plurality of wires 9, forming the circuits, are thus collectively disposed at the one side plate portion $12_1$, $22_1$ of the wiring sheet 10, 20. With this construction, for example, there can be easily carried out an operation in which the wires 9 are cut along the one side plate portion $12_1$, $22_1$ of the wiring sheet 10, 20, so that the circuits, provided with the plurality of wires 9, are formed at the wiring sheet 10, 20. Therefore, the circuits, provided with the plurality of wires 9, can be easily and rapidly formed at the wiring sheet 10, 20, and therefore there are provided the wiring sheets 10 and 20 which are excellent in productivity. And besides, the cost of the wiring sheets 10 and 20, as well as the cost of the electric distribution box 1 (FIGS. 6 and 9) having the wiring sheets 10 and 20 mounted therein, is reduced.

As shown in FIGS. 1, 2, 4 and 5, a plurality of mounting portions 22a for the end portions 9c of the wires 9, are formed at the one side plate portion $22_1$ of the wiring sheet 20, and the end portions 9c of the plurality of wires 9 are fixed to the plurality of mounting portions 22a, respectively. Similarly, a plurality of mounting portions 12a, corresponding to the end portions 9c of the wires 9, are formed at the one side plate portion $12_1$ of the wiring sheet 10, and the end portions 9c of the plurality of wires 9 are fixed to the plurality of mounting portions 12a, respectively.

Thus, the plurality of mounting portions 12a, 22a are provided at the one side plate portion $12_1$, $22_1$ of the wiring sheet 10, 20, and therefore the end portions 9c of the plurality of wires 9 are positively kept retained respectively in the plurality of mounting portions 12a, 22a formed in the one side plate portion $12_1$, $22_1$ of the wiring sheet 10, 20.

And besides, for example, the wires 9 can be cut at the one side plate portion $12_1$, $22_1$ of the wiring sheet 10, 20, using a cutting tool (not shown) such as a cutter, and by doing so, the operation for cutting the wires 9, installed on the wiring sheet 10, 20, can be carried out at one time, and therefore the operation for cutting the wires 9 is effected rapidly.

As shown in FIGS. 1 and 2, each of the mounting portions 22a, formed at the one side plate portion $22_1$ of the wiring sheet 20, is in the form of a groove 22a having a generally U-shape for holding the end portion 9c of the wire 9, and the end portion 9c of the wire 9 is press-fitted in the generally U-shaped groove 22a. Similarly, each of the mounting portions 12a, formed at the one side plate portion $12_1$ of the wiring sheet 10, is in the form of a groove 12a having a generally U-shape for holding the end portion 9c of the wire 9, and the end portion 9c of the wire 9 is press-fitted in the generally U-shaped groove 12a.

Since the end portions 9c of the plurality of wires 9 are press-fitted respectively in the plurality of grooves 12a, 22a formed in the wiring sheet 10, 20, the plurality of wires 9 are positively fixed to the one side plate portion $12_1$, $22_1$ of the wiring sheet 10, 20 over a long period of time. And besides, when the wire 9 is to be cut, for example, by a cutting tool (not shown) so as to form the circuits (provided with the plurality of wires 9) at the wiring sheet 10, 20, the wire 9 will not be flexed, thereby avoiding a trouble such as the failure to cut the wire 9, and as a result the circuits, provided with the plurality of wires 9, are easily and positively formed at the wiring sheet 10, 20.

As shown in FIG. 5, end surfaces 9d (that is, cutting surfaces 9d formed by the cutting tool (not shown)), formed respectively at the end portions 9c of the wires 9, are disposed outwardly of the board portion 11 and vertical side plate portion 12 (formed at the peripheral edge portion of the board portion 11) of the upper wiring sheet 10. Also, end surfaces 9d (that is, cutting surfaces 9d formed by the cutting tool (not shown)), formed respectively at the end portions 9c of the wires 9, are disposed outwardly of the board portion 21 and vertical side plate portion 22 (formed at the peripheral edge portion of the board portion 21) of the lower wiring sheet 20 as shown in FIG. 2.

When the plurality of wires 9 are thus installed on the wiring sheet 10, 20, any of the cutting surfaces 9d, formed respectively at the end portions 9c of the wires 9, is not disposed within a wiring area 10A, 20A of the wiring sheet 10, 20. The wiring area 20A means a wire-installing portion which is provided within the wiring sheet 20, and is defined by the board portion 21 and the side plate portions $22_1$, $22_2$ and $22_3$.

Therefore, the cutting surface 9d at the end portion 9c of each wire 9 will not contact a body portion (not shown) of the bus bar 30, the electrical contact portion 37 or the press-contacting terminal portion 39 provided within the wiring area 10A, 20A of the wiring sheet 10, 20, thereby preventing electrical troubles such as the short-circuiting in the circuits of the wiring sheet 10, 20, and therefore the reliability of the wiring sheets 10 and 20 is enhanced.

The wiring sheets 10 and 20 (shown in FIGS. 1 and 4) are received within the distribution box body 70 as shown in FIG. 6. The cutting surfaces 9d (shown in FIGS. 2 and 5), formed respectively at the end portions 9c of the wires 9, are protected by the side wall 72c of the distribution box body 70 shown in FIG. 6. More specifically, the cutting surfaces 9d, formed respectively at the end portions 9c of the wires 9 as shown in FIGS. 2 and 5, are disposed inwardly of a base wall 71 and one side wall 72c (formed at a peripheral edge portion of the base wall 71) of the distribution box body 70 shown in FIG. 6.

With this arrangement, the cutting surfaces 9d, formed respectively at the end portions 9c of the wires 9 by the cutting tool, will not be exposed to the exterior of the base wall 71 and side wall 72c of the distribution box body 70. Therefore, electrical troubles such as an electric leakage are prevented, and there can be provided the electric distribution box 1 of enhanced reliability.

Next, a method of cutting wire according to the invention will be described in detail with reference to FIGS. 10 and 11.

Figure 10:
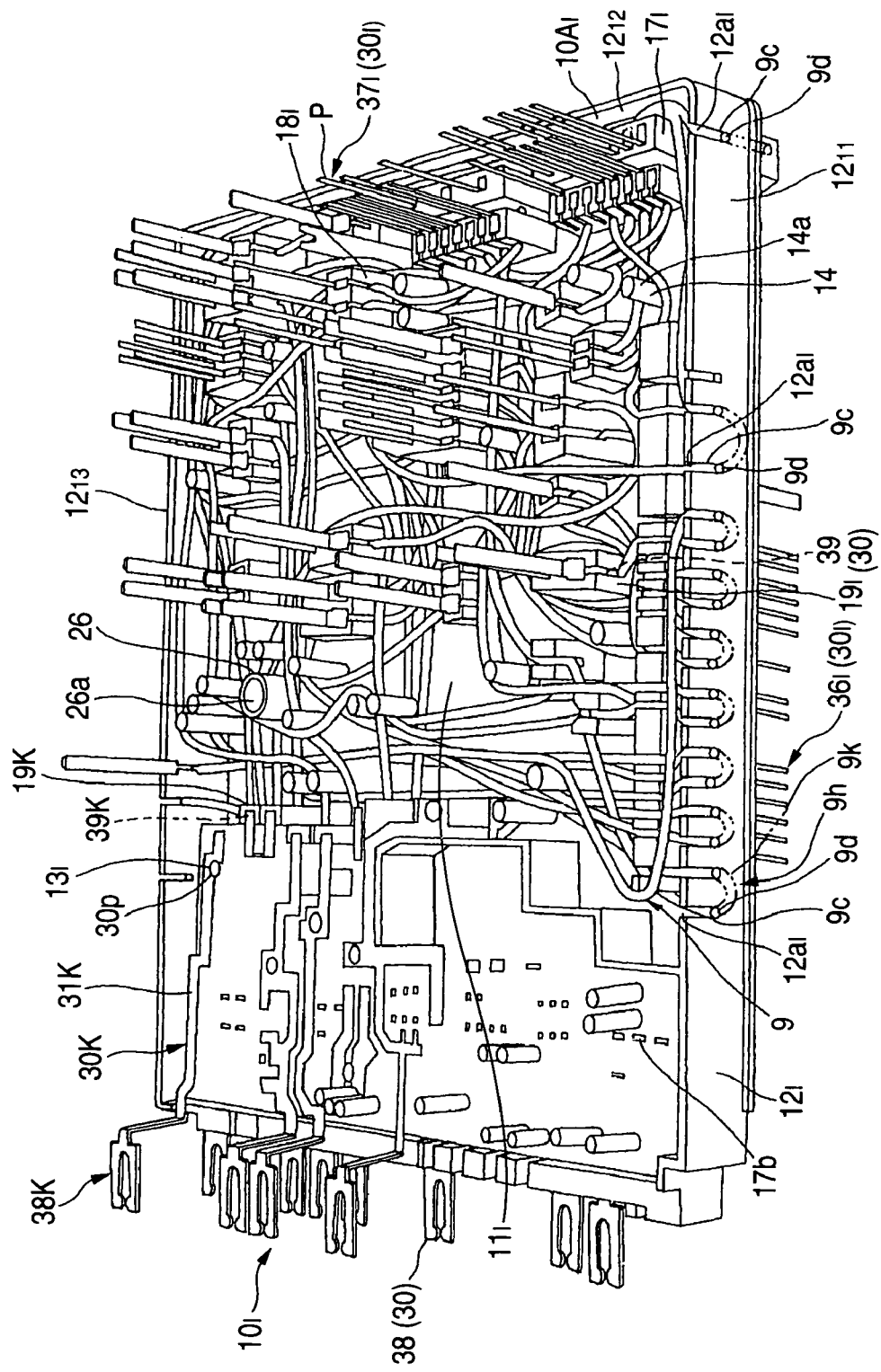
FIG. 10 is a perspective view showing another embodiment of the invention concerning a wiring sheet and a wire-cutting method.
Figure 11:
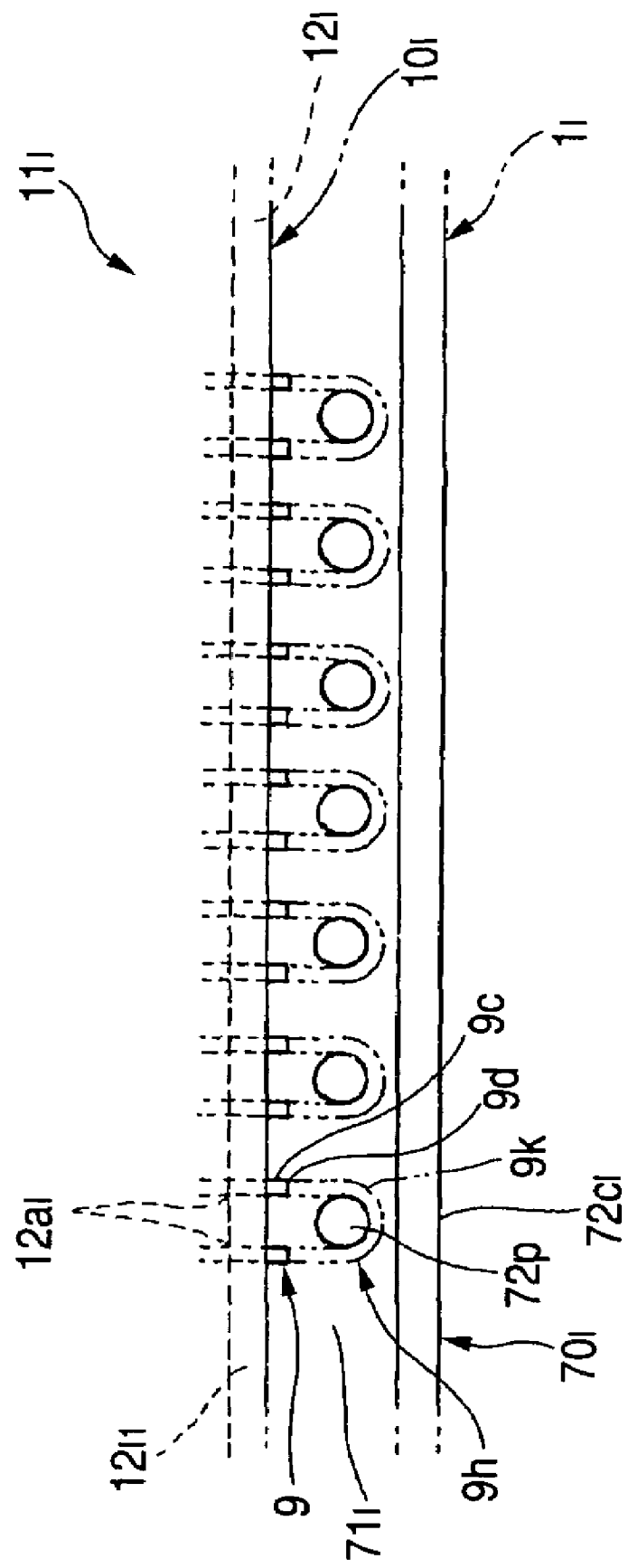
FIG. 11 is an explanatory view showing an important portion of another embodiment of an electric distribution box of the invention.

FIGS. 10 and 11 show another embodiment of the invention concerning a wiring sheet, an electric distribution box and a wire-cutting method. FIG. 10 shows the lower side of the wiring sheet $10_1$. That side at which electrical contact portions $37_1$ of bus bars 30, project from the wiring sheet $10_1$ is the lower side, and that side at which electrical contact portions $36_1$ of bus bars $30_1$ project from the wiring sheet $10_1$ is the upper side.

Instead of the wiring sheet 10 shown in FIGS. 1, 2, 4 and 5, the wiring sheet $10_1$, shown in FIG. 10, can be mounted on the electric distribution box. The wiring sheet 10, shown in FIGS. 1, 2, 4 and 5, has generally the same construction as that of the wiring sheet $10_1$ shown in FIG. 10. Those portions of the wiring sheet $10_1$ of FIG. 10 identical to those of the wiring sheet of FIGS. 1 to 5 will be designated by identical reference numerals, respectively, and detailed explanation thereof will be omitted.

The upper wiring sheet $10_1$ includes a board portion $11_1$ having a generally-rectangular shape in horizontal, and vertical side plate portions $12_{11}$, $12_{12}$ and $12_{13}$ formed at a peripheral edge portion of the board portion $11_1$. Wires 9 are installed on the wiring sheet $10_1$ in a complicated manner.

The bus bars 30 and $30_1$ are coated with a plating material P such as tin-plating P. Referring to a bus bar 30K having a tuning-fork terminal portion 38K, one end portion of a bus bar body 31K of this bus bar 30K is bent at generally right angles in a multi-stage manner to form the tuning-fork terminal portion 38K The other end portion of the bus bar body 31K is bent at generally right angles to form a press-contacting terminal portion 39K. Although this bus bar 30K is not subjected to a plating treatment, those bus bars 30, having tuning-fork terminal portions 38, are coated with tin-plating P.

Holding portions 19K (each having a passage hole), corresponding respectively to the press-contacting terminal portions 39K of the bus bars 30K, are formed at the board portion $11_1$ of the wiring sheet $10_1$. The press-contacting terminal portions 39K of the bus bars 30K are fitted respectively in the holding portions 19K formed at the board portion $11_1$ of the wiring sheet $10_1$.

A mounting portion 31p in the form of a through hole is formed in the bus bar body 31K Fixing portions $13_1$, corresponding respectively to the mounting portions 31p, are formed at the board portion $11_1$ of the wiring sheet $10_1$. The mounting portion 31p of the bus bar body 31K is fitted on the fixing portion 13, of the wiring sheet $10_1$, and the two are joined together, for example, by thermal welding, thereby fixing the bus bar 30K to the wiring sheet $10_1$.

Holding portions $17_1$ for the passage of electrical contact portions $37_1$ of tab-like bus bars $30_1$ therethrough are formed at the board portion $11_1$ of the wiring sheet $10_1$. Rectangular through holes 17b for the passage of tab-like terminal portions (projecting from a lower wiring sheet) therethrough are formed in the board portion $11_1$ of the wiring sheet $10_1$ disposed at an upper layer side of the electric distribution box.

As shown in FIG. 10, one wire 9 is press-contacted with press-contacting terminals 39 provided in a projected manner at the wiring sheet $10_1$, and this single wire 9 is installed over a wiring area $10A_1$ of the wiring sheet $10_1$. The single wire 9 is fixed to the side plate portion $12_1$ of the wiring sheet $10_1$ and holding portions $18_1$ and $19_1$. The single wire 9 is fitted in grooves in the holding portions $18_1$ and $19_1$ and grooves in the side plate portion $12_1$, so that this single wire 9 is mounted on the wiring sheet $10_1$. By doing so, the single wire 9 is positively attached to the wiring sheet $10_1$.

A wire 9 is fed from a wire feed portion (not shown) of a wiring apparatus (not shown) such as a wiring machine, and at this time the wiring apparatus (not shown) and the wiring sheet $10_1$ move relative to each other in forward, backward, right and left directions, so that the wire 9 is installed on the reverse side of the wiring sheet 10 in a complicated manner.

The wire 9 is suitably bent around side surfaces 14a of cylindrical projected portions 14 formed on the reverse side of the wiring sheet $10_1$, and by doing so, the direction of extending of the wire 9, installed on the wiring sheet $10_1$, can be changed. End portions 9c of the wires 9 are fitted respectively in mounting portions $12a_1$ formed in the side plate portion 12 of the wiring sheet $10_1$. The mounting portions $12a_1$ has U-shaped groove.

Figure 3A:
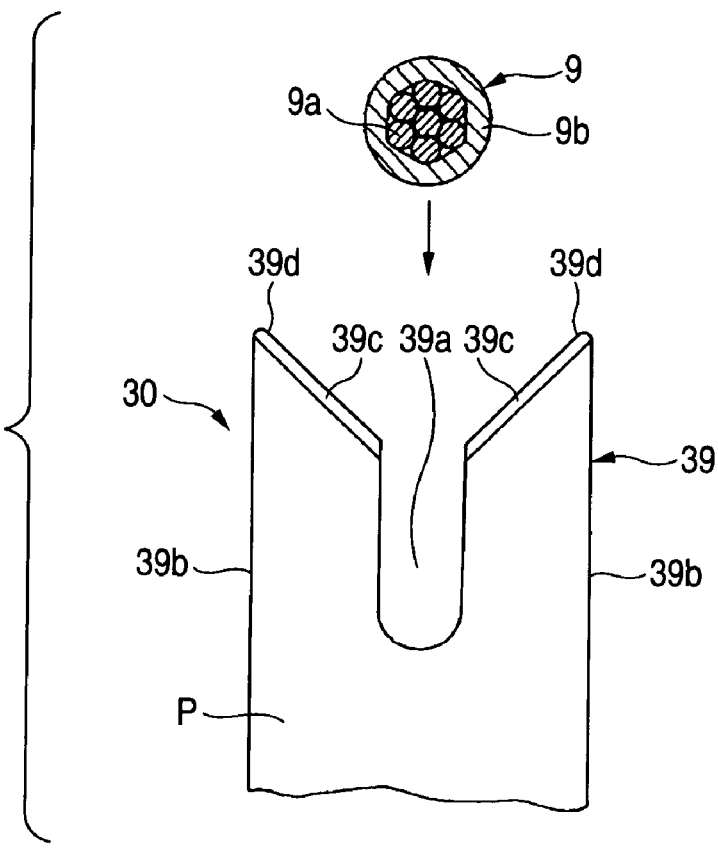
FIGS. 3A and 3B are views explanatory of the process of press-contacting a wiring member with a press-contacting terminal.

Press-contacting terminal portions 39 (each having, for example, a shape shown in FIG. 3) of the bus bars 30 are received in many holding portions $19_1$, respectively. As shown in FIG. 3A, the press-contacting terminal portion 39 of the bus bar 30, shown in FIG. 10, includes a press-contacting piece portion having a generally U-shaped press-contacting slit 39a formed between a pair of generally parallel press-contacting blades 39b. Slanting portions 39d, generally inwardly facing each other, are formed at the pair of plate-like press-contacting blades 39b, respectively, and an edge portion 39c is formed at each of the slanting portions 39d. The thickness of each plate-like press-contacting blade 39b is gradually decreasing such that the edge portion 39c on the slanting portion 39d is relatively sharp.

When the wiring member 9, having the circuit conductor 9a protected by the insulating sheath 9b, is pressed against the plurality of press-contacting terminal portions 39, and is press-connected thereto, the wiring member 9 is electrically connected to these press-contacting terminal portions 39. When the wiring member 9, having the circuit conductor 9a protected by the insulating sheath 9b, begins to be press-contacted with the pair of press-contacting blades 39b of the press-contacting terminal portion 39, the insulating sheath 9b of the wiring member 9 begins to be cut by the sharp edge portions 39c of the slanting portions 39d of the press-contacting blades 39b.

Figure 3B:
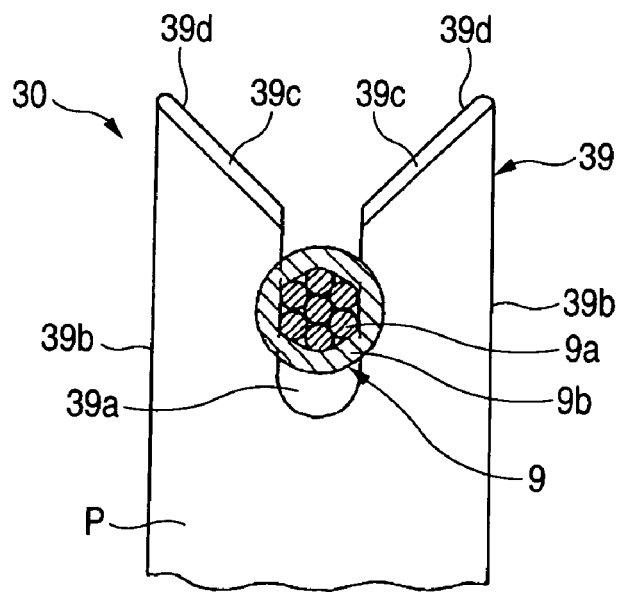

When the wiring member 9 is further pressed toward the press-contacting slit 39a between the pair of press-contacting blades 39b, the insulating sheath 9b of the wiring member 9 is cut by the press-contacting slit portion 39a of the press-contacting terminal portion 39, and the press-contacting slit portion 39a of the press-contacting terminal portion 39 is brought into contact with the circuit conductor 9a provided within the insulating sheath 9b of the wiring member 9, so that the wiring member 9 is electrically connected to the press-contacting terminal portion 39 as shown in FIG. 3B. Thus, in this press-connecting operation, the operation for removing the insulating sheath 9b of the wiring member 9 and the operation for connecting the circuit conductor 9a of the wiring member 9 to the press-contacting terminal portion 39 are carried out at the same time.

As shown in FIG. 10, portions 9h of one wire 9 are fixed to the side plate portion $12_1$ of the wiring sheet $10_1$, and the portions 9h of the single wire 9 are cut at the same time by the use of a cutting tool (not shown), thereby dividing the single wire 9 into a plurality of wires 9. As a result, a cutting surface 9d is formed at the end portion 9c of each of these wires 9. The wire-cutting operation is effected along one side plate portion $12_{11}$ of the wiring sheet $10_1$ by the use of the cutting tool (not shown), so that the operation for installing the wires 9 on the wiring sheet $10_1$ is finished.

By doing so, the portions 9h of one wire 9 can be easily cut. And besides, with this wire-cutting method, the portions 9h of the wire 9 can be cut efficiently and rapidly. Therefore, the efficiency of the process of cutting the wire 9 is enhanced.

The plurality of mounting portions $12a_1$, corresponding to the portions $9h$ of one wire $9$, are formed at the one side plate portion $12_{11}$ of the wiring sheet $10$ having a generally-rectangular shape. The portions $9h$ of one wire $9$ are fixed to the plurality of mounting portions $12a_1$ so as to bent the one wire $9$. By thus fixing the single wire $9$ to the wiring sheet $10_1$, the portions $9h$ of the single wire $9$ can be positively mounted at the mounting portions $12a_1$ of the one side plate portion $12_{11}$ of the wiring sheet $10_1$.

The portions $9h$ of one wire $9$ are fixed to the mounting portions $12a_1$ of the one side plate portion $12_{11}$ of the wiring sheet $10_1$, and then the portions $9h$ of the single wire $9$ are cut at the same time, and therefore it is only necessary to effect the cutting operation for the single wire $9$ at the mounting portions $12a_1$ of the one side plate portion $12_1$, of the wiring sheet $10_1$. Therefore, it is not necessary to effect the cutting operation for the single wire $9$ at various portions of the wiring sheet $10_1$. Therefore, the operation for cuffing the wire $9$ can be effected positively and rapidly.

Each of the mounting portions $12a_1$ is in the form of a generally U-shaped groove $12a_1$. The plurality of U-shaped grooves $12a_1$ for holding the portions $9h$ of one wire $9$ are formed in the one side plate portion $12_{11}$ of the wiring sheet $10_1$, and the portions $9h$ of the single wire $9$ are press-fitted into these grooves $12a_1$.

By doing so, the portions $9h$ of one wire $9$ are positively fixed to the one side plate portion $12_{11}$ of the wiring sheet $10_1$. Therefore, at the time of cutting the portions $9h$ of the single wire $9$, the portions $9h$ of the single wire $9$ are prevented from shaking relative to the wiring sheet $10_1$, and the cutting operation for the single wire $9$ is carried out easily and positively.

One wire $9$, laid on the board portion $11_1$ of the wiring sheet $10_1$, is extended to the outside of the side plate portion $12_1$ formed at the peripheral edge portion of the board portion $11_1$, and a portion $9h$ of the single wire $9$ is folded back to thereby introduce the single wire $9$ again into the inside of the side plate portion $12_1$. By doing so, the portion $9h$ of the single wire $9$ is fixed to the side plate portion $12_1$ of the wiring sheet $10_1$.

The wire $9$ is fixed in a direction generally perpendicular to the extending direction of the one side plate portion $12_{11}$ of the wiring sheet $10_1$, and a portion $9h$ of the wire $9$ is bent, and then the wire $9$ is fixed in a direction generally perpendicular to the extending of the one side plate portion $12_{11}$ of the wiring sheet $10_1$. This operation is repeated, so that the single wire $9$ is mounted on the one side plate portion $12_{11}$ of the wiring sheet $10_1$ as shown in FIG. 10.

By thus fixing one wire $9$ to the side plate portion $12_1$ of the wiring sheet $10_1$, the operation for cutting the single wire $9$ can be easily effected. For example, when the cutting operation for one wire $9$ is to be carried out by the use of the cutting tool (not shown), the cutting tool (not shown) is moved along the outer side of the side plate portion $12_1$ of the wiring sheet $10_1$, and as a result the portions $9h$ of the single wire $9$, disposed at the outside of the side plate portion $12_{11}$ of the wiring sheet $10_1$, are easily cut. Therefore, the process of cutting the wire $9$ is carried out rapidly. When this cutting process is effected, the end portions $9c$ of the plurality of wires $9$, forming the circuits, are collectively disposed at one side plate portion $12_{11}$ of the side plate portion $12_1$ of the wiring sheet $10_1$.

In one wire $9$ extended to the outside of the side plate portion $12_1$ of the wiring sheet $10_1$, the plurality of wire portions $9h$, formed by bending this wire $9$, are cut at the same time, and cutoff portions $9k$ are removed. With this wire-cutting method, troubles, such as the failure to cut the wire $9$, are prevented at the time of cutting the wiring member $9$. Therefore, the circuits, provided with the plurality of wires $9$, can be positively formed at the wiring sheet $10_1$. And besides, the end portions $9c$ of the majority of the wires $9$ are collectively disposed at the one side plate portion $12_{11}$ of the wiring sheet $10_1$.

The installation method, press-contacting method and cutting method for the wires $9$, shown in FIGS. 1, 2, 4 and 5, are performed according to generally the same procedure as described above for FIG. 10.

There can be used another method of cutting the wire $9$, in which the portions $9h$ of one wire $9$ are fixed to the one side plate portion $12_{11}$ of the wiring sheet $10_1$ as shown in FIG. 10, and then the wiring sheet $101$ is received in a distribution box body $70_1$, and at the same time the portions $9h$ of the single wire $9$ are fixed to engaging portions $72p$ provided at a side wall $72c_1$ of the distribution box body $70_1$, and then the plurality of portions $9h$, formed by bending the wire $9$, are simultaneously cut, and the plurality of cut-off portions $9k$ are removed. The engaging portions $72p$ having a generally cylindrical shape are formed on and extend upwardly from a base wall $71_1$ of the distribution box body $70_1$.

By doing so, the portions $9h$ of the single wire $9$ are positively retainingly engaged with the wiring sheet $10$ and the distribution box body $70_1$. Therefore, when cutting the portions $9h$ of the single wire $9$, the portions $9h$ of the wire $9$ are prevented from being much flexed, so that it is not difficult to effect the operation for cutting the portions $9h$ of the single wire $9$. Therefore, the portions $9h$ of the single wire $9$, retainingly engaged with the wiring sheet $10_1$ and the distribution box body $70_1$, are held in such a condition that these portions $9h$ can be cut positively and easily. After the portions $9h$ of the wire $9$ are cut, the cutoff portions $9K$ of the wire $9$ are removed from the distribution box body $70_1$, for example, by a suction apparatus.

Thereafter, the electric distribution box $1_1$ is assembled. The engaging portions $72p$, shown in FIG. 11, are provided only at the distribution box body $70_1$ of the electric distribution box $1_1$, and are not provided at the electric distribution box $1$ shown in FIG. 6. Except the provision of the engaging portions $72p$ and the difference between the side wall $72c$ (FIG. 6) and the side wall $72c_1$ (FIG. 11), the electric distribution box $1_1$, shown in FIG. 11, has generally the same construction as that of the electric distribution box $1$ shown in FIG. 9.

The wiring sheets $10$ and $20$, shown in FIGS. 1, 2, 4 and 5, are received in the receiving portion $73$ of the distribution box body $70$ shown in FIG. 6. The process of assembling the electric distribution box $1$ (shown in FIGS. 6 and 9) will be described in the following.

As shown in FIG. 6, this electric distribution box $1$ has such an assembling structure that external wire harnesses (not shown), provided on the upper side of the distribution box body $70$, are electrically connected via the plurality of bus bars $30$ to the electronic unit $5$ provided at the upper portion of the interior of the distribution box body $70$.

The electronic unit $5$ includes an insulating board portion (that is, a printed circuit board) $5A$ which is made of a synthetic resin, and has circuit conductors $5B$ printed thereon. Electric and electronic parts, including an IC package $5H$, a capacitor $5J$, relay connection bases $5K$ (to which relays (not shown) are connected), a connector $5L$ and another connector $5P$, are mounted on the insulating board portion $5A$. These parts are electrically connected via the circuit conductors made of a copper foil, thereby forming an electronic control device.

"IC" means an integrated circuit, and is an abbreviation of "Integrated Circuit". An IC is a kind of electronic circuit, and many circuit elements, such as transistors, diodes, resistors and capacitors, are associated on or within one substrate, and are interconnected by wiring, thereby forming the electronic circuit of a high-density structure.

The electronic control unit is often called "ECU". An electronic control unit includes control member controlled by a computer, and judgment member. The circuit conductors 5B, printed on the insulating board portion 5A made of a synthetic resin, are protected by an insulating coating 5C which is either transparent or translucent.

Metal terminals (not shown) are inserted in a connector housing 5M made of a synthetic resin, thereby forming the connector 5L. A rectangular opening 5D is formed through that portion of the board portion 5A disposed in registry with the lower surface of the connector 5L. With this construction, the electrical contact portions 36 of the corresponding bus bars 30 can be connected to the connector 5L from the lower side of this connector.

Mounting portions (not shown) of the terminals, provided in the connector 5L, are soldered respectively to the corresponding circuit conductors 5B printed on the insulating board portion 5A, and therefore are electrically connected to these circuit conductors 5B. Thus, the connector 5L, shown in FIG. 6, is used as a vertically-mounting-type connector for PCB. "PCB" means "printed circuit board".

The other connector 5P includes male metal terminals 5T, and a connector housing 5Q made of a synthetic resin. The male terminals 5T are electrically connected respectively to the corresponding circuit conductors 5B printed on the insulating board portion 5A.

As shown in FIGS. 5 and 6, the tab-like terminal portion 33 (FIG. 5) is formed at one end of the metal bus bar 30, and the tab-like electrical contact portion 36 is formed at the other end of the metal bus bar 30. The tab-like terminal portions 33, projecting from or passing through a power module 6, and the electrical contact portions 36, projecting from the synthetic resin-molded wiring sheet 10, extend upwardly relative to the synthetic resin-molded distribution box body 70 (FIG. 6) on which these are mounted. "A module" means is a unit forming part of an apparatus, a machine or a system, and is formed as a functional unit.

As shown in FIGS. 4 and 5, a projecting piece portion 55 extends from one side of a peripheral wall 52 of the synthetic resin-molded housing member 50, and the housing body 51 and the projecting piece portion 55 are molded integrally with each other, using a synthetic resin. The projecting piece portion 55 is in the form of a thin plate-like member of a generally inverted L-shape.

As shown in FIGS. 4 and 5, a step portion 55j is formed on a thinned portion 55n of the projecting piece portion 55 to form a thickened portion 55m on the projecting piece portion 55 of the housing member 50. The thinned portion 55n and thickened portion 55m of the projecting piece portion 55 are molded integrally with each other, using the same synthetic resin. Cavities 56 for respectively passing the electrical contact portions 36 of the bus bars 30 therethrough are formed through the thickened portion 55m of the projecting piece portion 55. A cavity means a vacant space, a hollow portion or a through hole. A separate molded member, serving as a separate thickened portion (55m), can be mounted on the projecting piece portion 55.

When the synthetic resin-molded housing member 50 is mounted on the distribution box body 70 of the electric distribution box 1, the power module 6 and the synthetic resin-molded wiring sheet 10, the tab-like metal terminal portions 33 project into a receiving portion 53 of the housing body 51 of the housing member 50, and is received therein, thereby forming a connector portion 3. As shown in FIGS. 4 and 5, the terminal portions 33 are disposed within an opening 54 in the receiving portion 53 of the housing body 51.

The connector portion 3 is formed, and also the electrical contact portions 36, projecting upwardly from the wiring sheet 10, are passed respectively through the cavities 56 formed through the projecting piece portion 55 of the housing member 50. At this time, the electrical contact portions 36, which have not been properly positioned, and therefore have been tilted, are inserted respectively into the cavities 56 in the projecting piece portion 55 of the housing member 50 as shown in FIGS. 4 to 6. As a result, the plurality of electric contact portions 36 are corrected in posture, and are arranged generally on a straight line. Also, the thus corrected electrical contact portions 36 are electrically connected respectively to the terminals (not shown) of the connector 5L (FIG. 6) mounted on the electronic unit 5.

Figure 9:
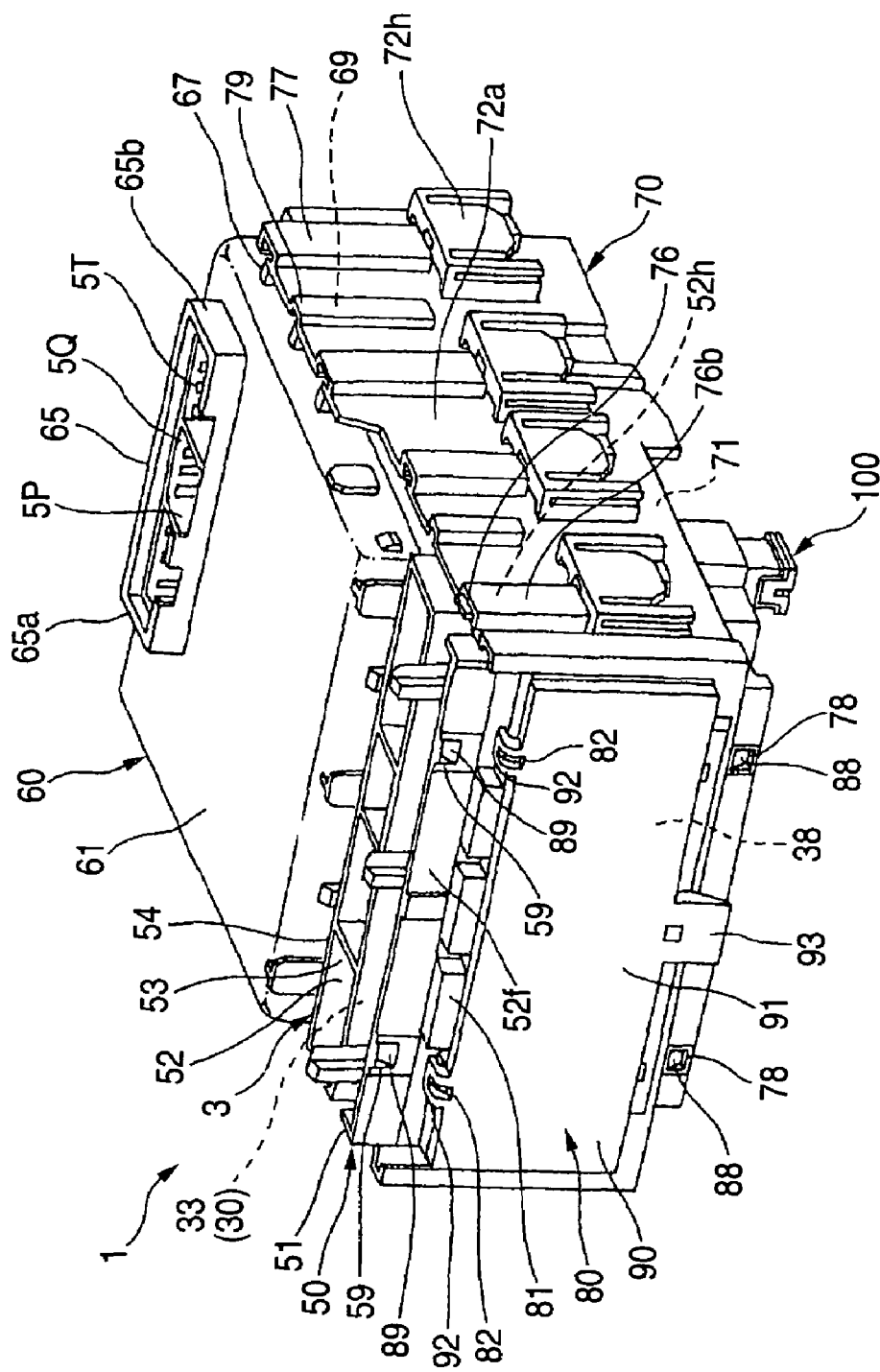
FIG. 9 is a perspective view showing the electric distribution box in its assembled condition.

As shown in FIG. 6, the electronic unit 5, the wiring sheet 10, etc., are mounted within the receiving portion 73 of the distribution box body 70. Part of the housing member 50, such as the projecting piece portion 55 of the housing member 50, are disposed within the distribution box body 70, while the housing body 51 of the housing member 50 is exposed to the exterior of the distribution box body 70 as shown in FIG. 9. The connector portion 3 is provided at the outside of the electric distribution box 1 so that the external wire harnesses (not shown) can be easily connected to this connector portion 3.

In order that the power module 6 can be easily mounted on the upper wiring sheet 10, a stepped portion 11B is formed at the board portion 11 of the upper wiring sheet 10. Also, other base plate portion 11A, corresponding in shape to a base plate portion 6A of the power module 6, extends from the board portion 11 of the wiring sheet 10 in such a manner that the other base plate portion 11A is disposed at a level lower than the upper base plate portion 11. The upper base plate portion 11 and lower other base plate portion 11A of the wiring sheet 10 are interconnected by the stepped portion 11B, and are molded integrally with each other.

As shown in FIGS. 4 and 5, positioning portions 15B of a generally cylindrical shape are formed on the other base plate portion 11A of the upper wiring sheet 10. The positioning portions 15B, formed on the other base plate portion 11A of the wiring sheet 10, project upwardly beyond the base plate portion 6A of the power module 6. In order that the housing member 50 can be easily mounted on the power module 6 and the upper wiring sheet 10, the positioning portions 15B extend upwardly respectively through circular holes (not shown) formed in the base plate portion 6A of the power module 6. As shown in FIG. 4, a plurality of positioning portions 55b (each in the form of a generally-circular hole), corresponding respectively to the plurality of positioning portions 15B, are formed in the projecting piece portion 55 of the housing member 50.

In order that the housing member 50 can be mounted on the board portion 11 of the upper wiring sheet 10 in a properly positioned manner, a plurality of positioning portions 11h having a generally-cylindrical shape are formed on the board portion 11 of the wiring sheet 10 as shown in FIGS. 4 and 5. A plurality of positioning portions 55h (each in the form of a generally-circular hole), corresponding respectively to the plurality of positioning portions 11h, are formed in the projecting piece portion 55 of the housing member 50.

In order that the electronic unit 5 (shown in FIG. 6) can be positively mounted within the electric distribution box 1, a plurality of fixing portions 15A, each having a fixing hole $15A_L$, are formed on the upper side of the board portion 11 of the wiring sheet 10 as shown in FIGS. 4 and 5. Also, the plurality of fixing portions 15B, each having a fixing hole $15B_L$, are formed on the other base plate portion 11A of the wiring sheet 10.

The fixing portions 15B, formed on the upper side of the other base plate portion 11A of the wiring sheet 10, serve also as the positioning portions 15B by which the mounting directions of the power module 6 and housing member 50 can be easily recognized. A plurality of fixing portions (each having a generally-cylindrical fixing hole $5V_L$), corresponding respectively to the plurality of generally-cylindrical fixing portions 15A and 15B, are formed in the base portion 5A of the electronic unit 5 as shown in FIG. 6.

The electrical contact portions 36, projecting upwardly from the upper wiring sheet 10 and the projecting piece portion 55 of the housing member 50, are connected respectively to the terminals (not shown) of the connector 5L provided at the electronic unit 5, and also the fixing holes $15A_L$ of the fixing portions 15A (formed on the board portion 11 of the wiring sheet 10) and the fixing holes $15B_L$ of the fixing portions 15B (formed on the other base plate portion 11A of the wiring board 10) are aligned with the respective fixing holes $5V_L$ formed in the board portion 5A of the electronic unit 5. Then, fastening elements (not shown), such as screws, are inserted respectively into the fixing holes $5V_L$ formed in the board portion 5A of the electronic unit 5, and further are passed respectively through the corresponding fixing holes $15A_L$ and $15B_L$ of the fixing portions 15A and 15B (The fixing portions 15A are formed on the board portion 11 of the wiring sheet 10, and the fixing portions 15B are formed on the other base plate portion 11A). Further, for example, screw portions (not shown) of these fastening elements are threaded respectively into the fixing holes 25a of the fixing portions 25 shown in FIGS. 1 and 2, and by doing so, the electronic unit 5 is positively fixed to the wiring sheets 10 and 20.

As shown in FIG. 4, a plurality of fixing portions 55d (each in the form of a generally-circular hole) are formed in the projecting piece portion 55 of the housing member 50, and a plurality of fixing portions 6D (each in the form of a generally-circular hole) are formed in the base plate portion 6A of the power module 6. A plurality of other fixing portions (not shown) of a generally-cylindrical shape, corresponding respectively to the fixing portions 6D and also respectively to the fixing portions 55d, are formed on the other base plate portion 11A of the wiring sheet 10. As shown in FIGS. 1 and 2, the fixing portions 26 of a generally-cylindrical shape are formed on the board portion 21 of the lower wiring sheet 20, and the electronic unit 4 is provided at the lower side of the wiring sheet 20, and generally-cylindrical fixing portions (not shown) (each in the form of a generally-circular hole) are formed in a base plate portion of the electronic unit 4. Elongate fastening elements (not shown), such as screws, are passed through these fixing portions, and for example, screw portions of these fastening elements are threaded respectively into fixing portions (not shown) formed on the bottom wall 71 of the distribution box body 70 (FIG. 6), and by doing so, the housing member 50, the power module 6, the upper wiring sheet 10, the lower wiring sheet 20 and the electronic unit 4 are positively fixed to the distribution box body 70.

Figure 12:
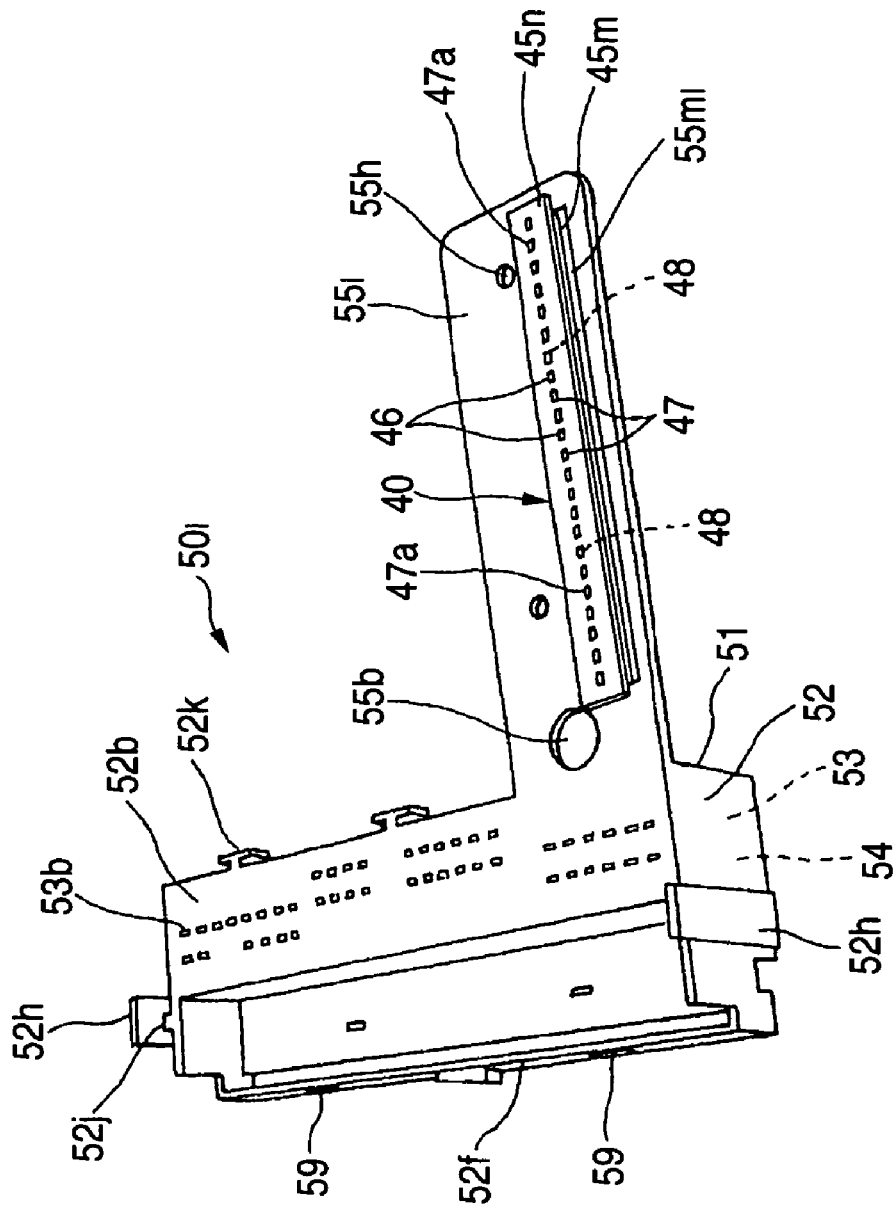
FIG. 12 is a perspective view showing another embodiment of a housing member of the invention.
Figure 13:
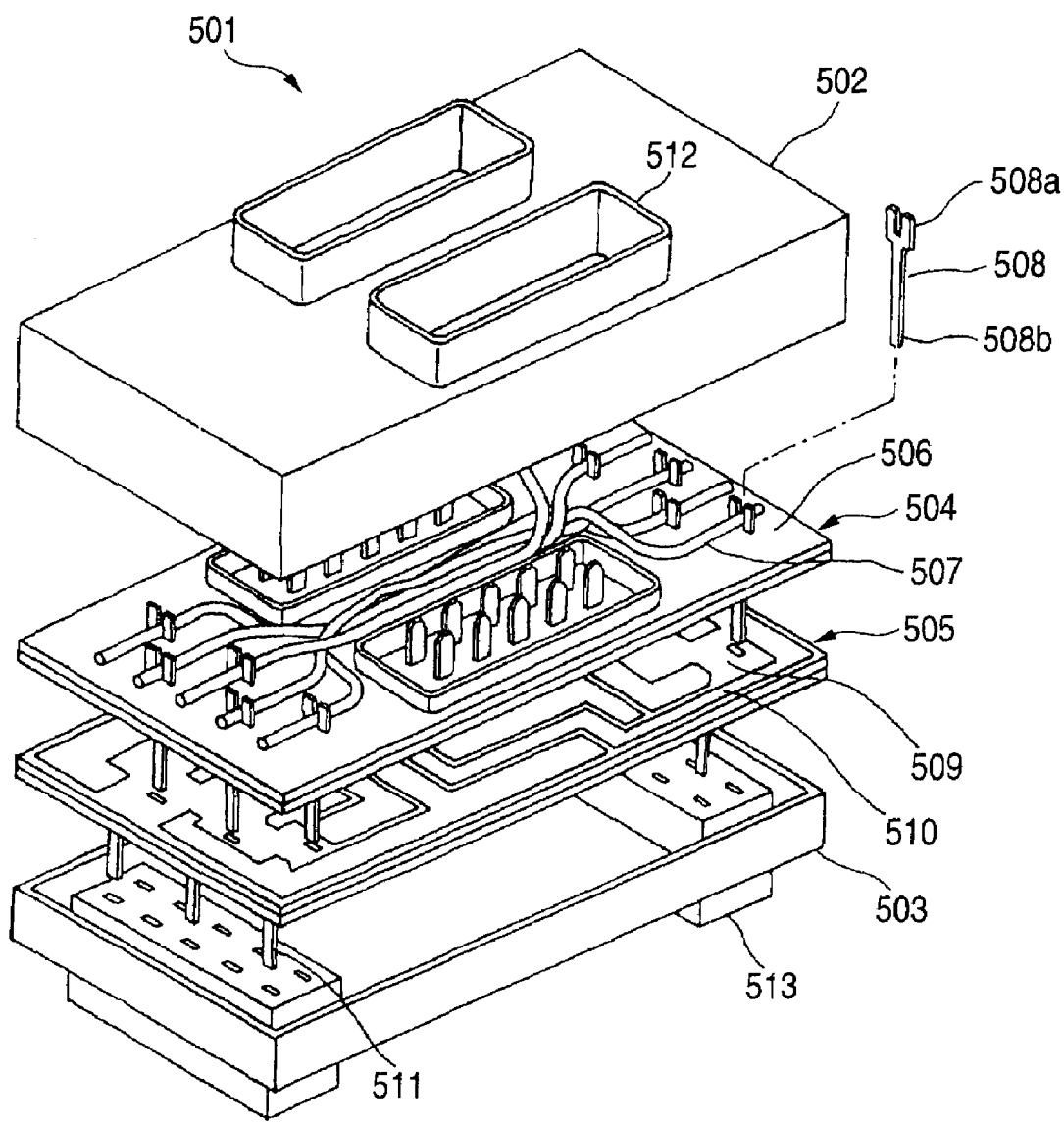
FIG. 13 is an exploded, perspective view showing one related electric distribution box.

Instead of the synthetic resin-molded housing member 50 shown in FIGS. 4 to 6, a synthetic resin-molded housing member $50_1$, shown in FIG. 12, can be mounted in the electric distribution box. FIG. 12 shows another embodiment of the housing member. Those portions of the housing member $50_1$ of FIG. 12 identical to those of the housing member 50 of FIGS. 4 to 6 will be designated by identical reference numerals, respectively, and detailed explanation thereof will be omitted.

The housing member $50_1$, shown in FIG. 12, includes a housing body 51, a projecting piece portion $55_1$ extending from one end of the housing body 51, and a holding member 40 which is mounted on the projecting piece portion $55_1$, and has cavities 46.

A plurality of juxtaposed through holes 53b for the passage of the terminal portions of the various bus bars therethrough are formed through a base wall 52b of the housing body $51_1$. The projecting piece portion $55_1$ of the housing member $50_1$, shown in FIG. 12, is in the form of a rectangular plate smaller in size than the projecting piece portion 55 of the housing member 50 shown in FIGS. 4 to 6, and this projecting piece portion $55_1$ extends from one end of the base wall 52b of the housing body 51 (FIG. 12).

Instead of the thickened portion 55m on the projecting piece portion 55 of the housing member 50 shown in FIGS. 4 and 5, a generally-rectangular window-like opening $55m_1$ is formed in the projecting piece portion $55_1$ of the housing member $50_1$, and the holding member 40, made of a synthetic resin, is mounted in this opening $55m_1$.

The holding member 40 includes an elongate thinned portion 45n in the form of a generally-rectangular plate, and a thickened portion 45m of a generally rectangular parallelepiped shape formed on and projecting from the thinned portion 45n. The plate-like thinned portion 45n and the thickened portion 45m of a generally rectangular parallelepiped shape are molded integrally with each other, using the same synthetic resin.

The plurality of cavities 46 (each in the form of a rectangular hole) are formed in the thickened portion 45m of the holding member 40. Each of the cavities 46 is in the form of a through hole having an insertion portion 47 and an opening 48, and the electrical contact portions of the associated bus bars are passed through the plurality of cavities 46, respectively.

A small tapering surface is formed at the insertion portion 47 of each cavity 46 in the holding member 40. Since the tapering surface 47a is formed at the insertion portion 47 of the cavity 46, the electrical contact portions of the plurality of bus bars can be easily inserted into the plurality of cavities 46, respectively.

The holding member 40 is formed as a small injection molded product made of a synthetic resin, and therefore the holding members 40, having the cavities 46 each having the small tapering surface 47a, can be mass-produced precisely and rapidly.

As shown in FIG. 5, slanting surfaces 36k are formed at a distal end 36j of a straight portion 36h of each of the electrical contact portions 36 so that the plurality of electrical contact portions 36 can be simultaneously easily inserted respectively into the plurality of cavities 56 even when any or all of the tab-like electrical contact portions 36 are tilted in the direction of the thickness of these electrical contact portions 36.

As shown in FIGS. 4 and 12, guide portions 52h are formed at the opposite ends of the housing member 50, respectively, and guide receiving portions 76, corresponding respectively to these guide portions 52h, are formed respectively at the opposed side walls 72a and 72c of the distribution box body 70 as shown in FIG. 6.

As shown in FIGS. 6 and 9, each of the guide receiving portions 76 of the distribution box body 70 has a guide groove 76 of a generally T-shaped cross-section, and each of the guide portions 52h of the housing member 50 includes a plate-like guide piece portion 52h corresponding to the guide groove 76, as shown in FIGS. 4 and 12. Support portions 52j are formed on and project outwardly from the peripheral wall 52 of the housing member 50, and the guide piece portions 52h of the housing member 50 are formed on outer edges of these support portions 52j, respectively.

As shown in FIG. 6, each of the guide receiving portions 76 of the distribution box body 70 includes a frame portion 76b extending outwardly from the side wall 72a, 72c of the distribution box body 70, and an elongate narrow groove corresponding to the support portion 52j (FIGS. 4 and 12) of the housing member 50.

As shown in FIG. 6, the connector portion 3 and the electronic unit 5 are juxtaposed to each other in adjoining relation to each other at the upper layer side of the distribution box body 70 where the connector portion 3 and the electronic unit 5 are provided. The connector portion 3 and the electronic unit are juxtaposed to each other above the wiring sheet 10 mounted in the receiving portion 73 of the distribution box body 70.

In the electric distribution box 1 of this arrangement structure, the electronic unit 5 can be easily mounted on the distribution box body 70. When connecting the connectors (not shown) of the external wire harnesses (not shown) to the connector portion 3 of the electric distribution box 1 shown in FIG. 1, this connecting operation can be carried out easily.

As shown in FIGS. 6 and 9, the fuse block 80 is provided at the front side of the electric distribution box 1. The fuse box is a block-like part in which a plurality of fuses are mounted in a mating mounting member (such as a housing, a base or a holder) to form a unit.

The fuse block 80 includes the synthetic resin-molded front cover 90 for protecting the fuses (not shown). This front cover 90 includes a cover body 91, a pair of hinge portions 92 detachably connected to a fuse block body 81, and an operating portion 93 which is provided at a lower side of the cover body 91 so as to enable the front cover 90 to be easily opened and closed relative to the synthetic resin-molded fuse block body 81.

The pair of hinge portions 92, formed at the upper side of the front cover 90, are connected respectively to a pair of hinge portions 82 formed at the front side of the fuse block body 81, and by doing so, the front cover 90 is mounted on the fuse block body 81 so as to be opened and closed. Since the front cover 90 is thus mounted on the front side of the fuse block body 81 so as to be opened and closed, the maintenance, such as the exchange of the fuses (not shown) provided within the fuse block body 81, can be carried out easily.

A pair of retaining portions 88 (each having a retaining projection 88) are formed at a lower portion of the front side of the fuse block body 81, while a pair of retaining portions 89 (each having a retaining projection 89) are formed at an upper portion of the front side of the fuse block body 81. A pair of engagement portions 78 (each having an engagement hole 78 of a rectangular shape), corresponding respectively to the pair of retaining portions 88 formed at the lower portion of the front side of the fuse block body 81, are provided at a lower portion of the front side of the distribution box body 70. A pair of engagement portions 59 (each having an engagement hole 59 of a rectangular shape), corresponding respectively to the pair of retaining portions 89 formed at the upper portion of the front side of the fuse block body 81, are provided at a front wall 52f of the housing member 50.

The pair of engagement portions 78, provided at the lower portion of the front side of the distribution box body 70, are retainingly engaged respectively with the pair of retaining portions 88 provided at the lower portion of the front side of the fuse block body 81, so that the fuse block body 81 is positively mounted on the distribution box body 70. The pair of retaining portions 89, provided at the upper portion of the front side of the fuse block body 81, are retainingly engaged respectively with the pair of engagement portions 59 provided at the front wall 52f of the housing member 50, so that the housing member 50 is attached to the distribution box body 70 and the fuse block 80 mounted on the distribution box body 70.

The plurality of layers of tuning-fork terminal portions 38 (shown in FIG. 1) are disposed within the fuse block body 81 shown in FIGS. 6 and 9. The plurality of layers of tuning-fork terminal portions 38 are formed respectively by the extension portions of the various bus bars 30.

When the fuse block 80, having the plurality of blade-type fuses (not shown) received therein, is attached to the front side of the distribution box body 70 as shown in FIG. 6, tab terminals (not shown) of the blade-type fuses within the fuse block body 81 are electrically connected respectively to the plurality of layers of tuning-fork terminal portions 38 shown in FIG. 1.

Thus, in the electric distribution box 1 (FIG. 6), the fuse block 80 (FIG. 6), having the blade-type fuses (not shown) received therein, is used, and the tab terminals (not shown) of the blade-type fuses are electrically connected respectively to the plurality of layers of tuning-fork terminal portions 38 shown in FIG. 1. Therefore, the plurality of blade-type fuses (not shown) can be easily and rapidly provided in the electric distribution box 1. Therefore, the efficiency of the operation for mounting the blade-type fuses (not shown) in the electric distribution box 1 is enhanced.

According to the specification of the electric distribution box, other terminals (for example, tab-like terminals or female terminals) than the plurality of layers of tuning-fork terminal portions 38 can be used.

Figure 7:
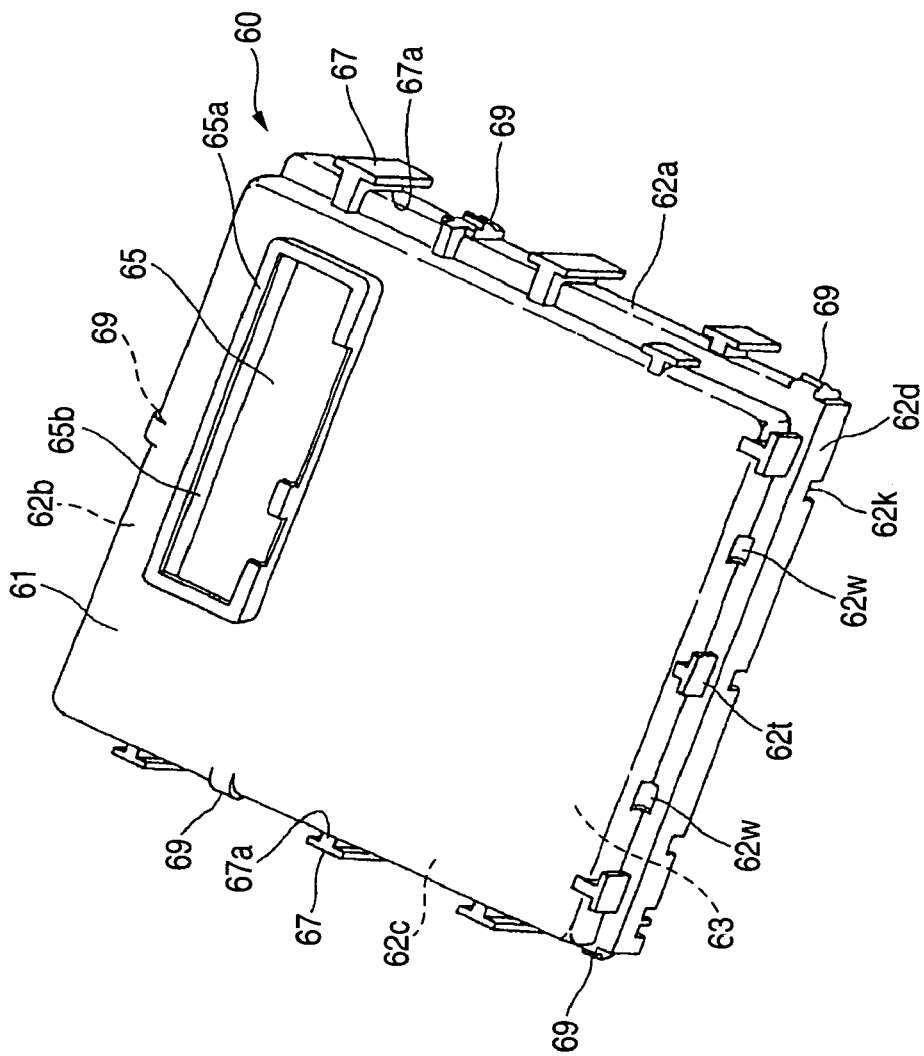
FIG. 7 is a perspective view showing an outer side of a cover.
Figure 8:
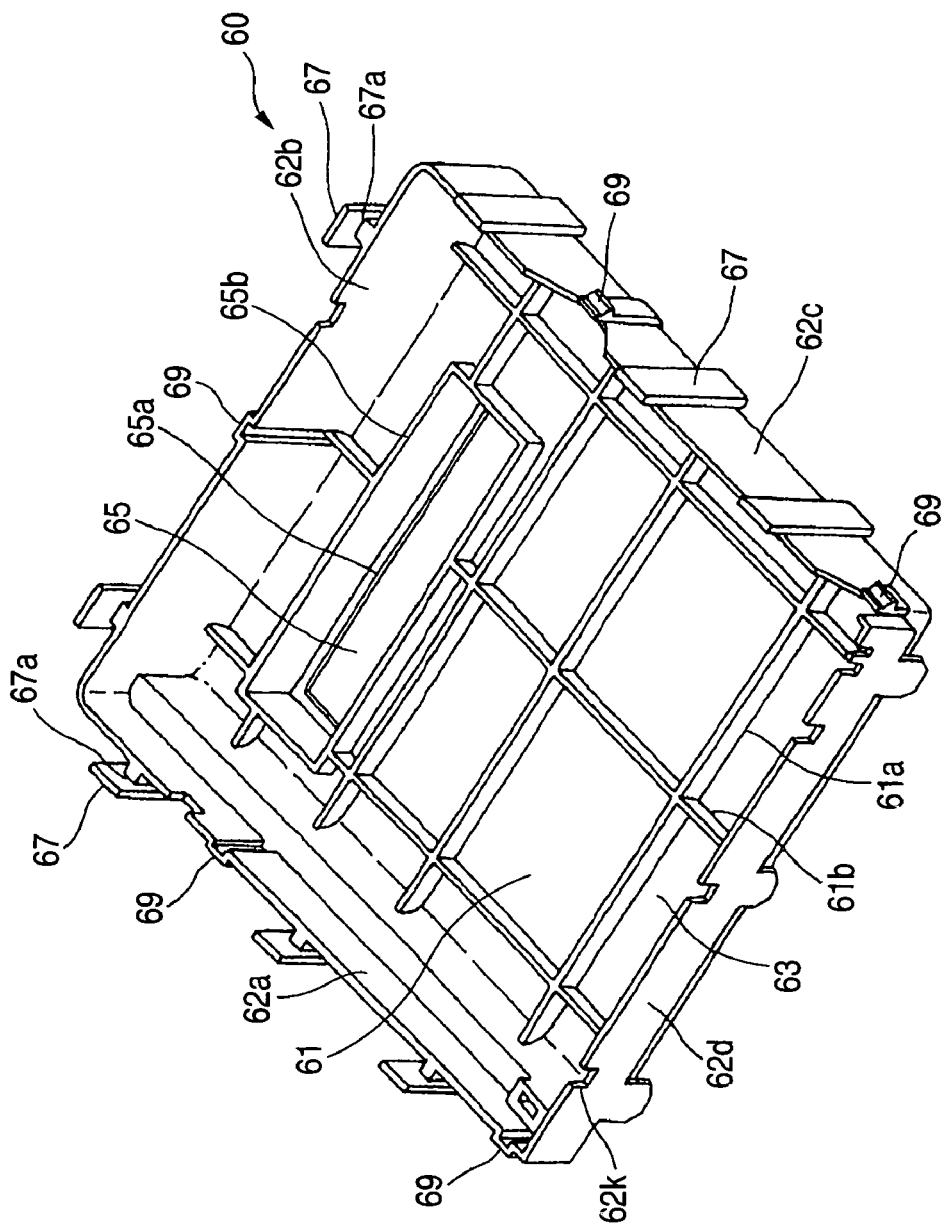
FIG. 8 is a perspective view showing an inner side of the cover.

A synthetic resin-molded upper cover 60, shown in FIGS. 7 and 8, is attached to the distribution box body 70 (shown in FIG. 6), so that the electric distribution box 1 is assembled as shown in FIG. 9.

As shown in FIGS. 7 and 8, the upper cover 60 includes a generally-rectangular top wall 61, and side walls 62a, 62b, 62c and 62d formed at a peripheral edge portion of the top wall 61. The upper cover 60 has a receiving portion 63 therein as shown in FIG. 8. A generally-rectangular opening 65, corresponding to the connector 5P of the electronic unit 5, is formed through the top wall 61 of the upper cover 60 as shown in FIGS. 7 and 8.

As shown in FIGS. 7 and 8, a rib 65a is formed at a peripheral edge of the opening 65 in the upper cover 60. A guide rib 65b extends from the rib 65a (formed at the peripheral edge of the opening 65 in the upper cover 60) into the interior of the upper cover 60. The rib 65a corresponds in shape to an upper end portion 5R of the connector housing 5Q of the connector 5P shown in FIG. 6. The guide rib 65b, shown in FIGS. 7 and 8, corresponds in shape to a side wall portion 5S of the connector housing 5Q of the connector 5P shown in FIG. 6.

As shown in FIG. 7, a plurality of generally T-shaped projections 62t are formed on the side wall 62d of the upper cover 80, and also a pair of windows 62w are formed in this side wall 62d. Ribs 61a and 62b which intersect one another lengthwise and widthwise are formed on the inner surface of the top wall 61 of the upper cover 60 to increase the strength of the upper cover 60.

As shown in FIGS. 7 and 8, a plurality of guide portions 67 are formed on the side walls 62a, 62b and 62c of the upper cover 60, and a plurality of guide portions 77, corresponding respectively to the guide portions 67, are formed on the side walls 72a, 72b and 72c of the distribution box body 70 as shown in FIG. 6. Also, a plurality of frame-like projections 72h are formed on the side walls 72a, 72b and 72c of the distribution box body 70.

As shown in FIG. 6, each of the guide receiving portions 77 of the distribution box body 70 has a guide groove 77 of a generally T-shaped cross-section, and each of the guide portions 67 of the upper cover 60 includes a plate-like guide piece portion 67 corresponding to the guide groove 77, as shown in FIGS. 7 and 8.

Support portions 67a are formed on and project outwardly from the side walls 62a, 62b and 62c of the upper cover 60, and the guide piece portions 67 of the upper cover 60 are formed on outer edges of these support portions 67a, respectively. As shown in FIG. 6, each of the guide receiving portions 77 of the distribution box body 70 includes a frame portion 77b extending outwardly from the side wall 72a, 72b, 72c of the distribution box body 70, and an elongate narrow groove 77a (FIG. 6) corresponding to the support portion 67a of the upper cover 60.

As shown in FIGS. 7 and 8, retaining portions 69 (each having a retaining projection 69) are formed on the side walls 62a, 62b and 62c of the upper cover 60. Engagement portions 79 (each having an engagement projection (not shown)), corresponding respectively to the retaining portions 69, are formed on the side walls 72a, 72b and 72c of the distribution box body 70 shown in FIG. 6.

After the electronic unit 5 is mounted within the distribution box body 70 (FIG. 6), the cover 60 (shown in FIG. 7) is fitted on the distribution box body 70, and is attached thereto, so that the electric distribution box 1 is assembled as shown in FIG. 9.

At this time, the retaining portions 69 of the cover 60 (shown in FIG. 7) are retainingly engaged respectively with the engagement portions 79 of the distribution box body 70 shown in FIG. 6, and as a result the cover 60 is positively attached to the distribution box body 70 in such a manner that the cover 60 will not shake relative to the distribution box body 70. At the same time, a plurality of engagement portions 62k, provided at the side wall 62d of the cover 60 shown in FIGS. 7 and 8, are engaged respectively with a plurality of retaining portions 52k provided at the peripheral wall 52 of the housing member 50 shown in FIGS. 4 and 12.

Thereafter, the connectors of the external wire harnesses (not shown) are electrically connected to the connector portion 3 of the electric distribution box 1 shown in FIG. 9, and also the connectors of the other external wire harnesses (not shown) are connected to the connector portion 5P of the electric distribution box 1. The electric distribution box 1 is used as a junction box (abbreviated as "J/B"). The electric distribution box can also be used, for example, as a relay box (abbreviated as "R/B") or the like.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An electric distribution box, comprising:
a wiring sheet for installing a plurality of wires thereon, including:
a side plate portion, at which end portions of the wires forming circuits are collectively disposed, and
bus bar holding portions, wherein all of the bus bars holding portions are provided inside of said side plate portion; and
a main body, housing the wiring sheet therein, and having a side wall which covers end surfaces of the end portions of the plurality of wires protruded from the side plate portion.

2. The electric distribution box as set forth in claim 1, wherein the main body has a base wall on which the wiring sheet is placed;
wherein the side wall is formed at a peripheral portion of the base wall; and
wherein the end portions of the wires are disposed inside of the base wall and the side wall of the main body.

3. The electric distribution box as set forth in claim 1, wherein a plurality of mounting portions are formed on the side plate portion; and
wherein the end portions of the wires are fixed to the plurality of mounting portions, respectively.

4. The electric distribution box as set forth in claim 1, wherein each of the mounting portions has a groove for holding the end portion of each of the wires.

5. The electric distribution box as set forth in claim 1, wherein the wiring sheet includes a board portion placed horizontally;
wherein the side plate portion is vertically formed at a peripheral portion of the board portion; and
wherein the end portions of the wires are disposed outside of the board portion and the side plate portion of the wiring sheet.

* * * * *